(12) United States Patent
Liu et al.

(10) Patent No.: US 12,399,505 B2
(45) Date of Patent: Aug. 26, 2025

(54) SYSTEM AND METHOD FOR AUTONOMOUS LANDING OF AN UNMANNED AERIAL VEHICLE

(71) Applicants: VOLATUS AEROSPACE INC., Vaughan (CA); The Governing Council of The University of Toronto, Toronto (CA)

(72) Inventors: Hugh Hong-Tao Liu, Richmond Hill (CA); Silas Kevin Isaac Graham, Gravenhurst (CA)

(73) Assignees: Volatus Aerospace Inc., Vaughan (CA); The Governing Council of the University of Toronto, Toronto (CA)

(*) Notice: Subject to any disclaimer, the term of this patent is extended or adjusted under 35 U.S.C. 154(b) by 94 days.

(21) Appl. No.: 16/787,721

(22) Filed: Feb. 11, 2020

(65) Prior Publication Data
US 2021/0247781 A1    Aug. 12, 2021

(51) Int. Cl.
*G05D 1/00* (2024.01)
*B64D 9/00* (2006.01)
(Continued)

(52) U.S. Cl.
CPC .............. *G05D 1/101* (2013.01); *B64D 9/00* (2013.01); *B64U 10/14* (2023.01); *G05D 1/0088* (2013.01);
(Continued)

(58) Field of Classification Search
None
See application file for complete search history.

(56) References Cited

U.S. PATENT DOCUMENTS 9,783,297 B2    10/2017   Patrick et al.
11,036,240 B1 *  6/2021   Irschara ............. G06K 9/00637
(Continued)

OTHER PUBLICATIONS

Sani et al., Automatic landing of a low-cost quadrotor using monocular vision and Kalman filter in GPS-denied environments, 2019, Turkish Journal of Electrical Engineering and Computer Sciences, p. 1821-1838 (Year: 2019).*
(Continued)

*Primary Examiner* — Jelani A Smith
*Assistant Examiner* — Davin Seol

(57) ABSTRACT

Various embodiments of a system and method for landing an unmanned aerial vehicle are described herein. The system includes at least one memory and at least one processor, wherein the at least one memory is operatively coupled to the at least one processor; the at least one processor being configured to control landing of the unmanned aerial vehicle by executing the modified PPN guidance law algorithm, wherein the modified PPN guidance law algorithm comprises: determining a current position for the unmanned aerial vehicle; determining a distance of the current position from a target position; generating at least one velocity command from the determined distance, the velocity command reducing to zero as the distance reduces to zero; and controlling the unmanned aerial vehicle to maintain the velocity thereof at the velocity command, whereby as the unmanned aerial vehicle approaches the target destination, the velocity of the aerial vehicle reduces to zero.

40 Claims, 24 Drawing Sheets

(51) Int. Cl.
  *B64U 10/14*   (2023.01)
  *B64U 101/64*  (2023.01)
(52) U.S. Cl.
  CPC ...... *B64U 2101/64* (2023.01); *B64U 2201/10* (2023.01); *B64U 2201/104* (2023.01)

(56) References Cited

U.S. PATENT DOCUMENTS

2020/0207474 A1\* 7/2020 Foggia ............... B64C 39/02
2020/0218288 A1\* 7/2020 Johnson ............. G05D 1/106

OTHER PUBLICATIONS

Gautam et al., Application of Guidance Laws to Quadrotor Landing, 2015, 2015 International Conference on Unmanned Aircraft Systems (ICUAS), p. 372-379 (Year: 2015).\*
Ellis, Velocity Command, 2012, Science Direct, p. 1-9 (Year: 2012).\*
Kui et al., Sliding Mode Control for a Quadrotor Slung Load System, 2017, Proceedings of the 36th Chinese Control Conference, p. 3697-3703 (Year: 2017).\*
Cho et al., Modified Pure Proportional Navigation Guidance Law for Impact Time Control, 2016, Journal of Guidance, Control, and Dynamics, vol. 39, No. 4, p. 852-872 (Year: 2016).\*
Yang et al., Precise Quadrotor Autonomous Landing with SRUKF Vision Perception, 2015, IEEE, pp. 2196-2201 https://ieeexplore.ieee.org/abstract/document/7139489 (Year: 2015).\*
V. Sudevan, A. Shukla and H. Karki, "Vision based autonomous landing of an Unmanned Aerial Vehicle on a stationary target," 2017 17th International Conference on Control, Automation and Systems (ICCAS), Jeju, Korea (South), 2017, pp. 362-367, doi: 10.23919/ICCAS.2017.8204466. (Year: 2017).\*
Qian et al., "Dynamics and control of a quadrotor with a cable suspended payload", 2017 IEEE 30th Canadian Conference on Electrical and Computer Engineering (CCECE), IEEE, 2017, pp. 1-4.
Qian et al., "Path following control of a quadrotor UAV with a cable suspended payload under wind disturbances", IEEE Transations on Industrial Electronics, 2019.
Alothman et al., "Quad-rotor lifting-transporting cable-suspended payloads control", 2015 21st International Conference on Automation and Computing (ICAC), IEEE, 2015, pp. 1-6.
Cruz et al., "Autonomous lift of a cable-suspended load by an unmanned aerial robot", 2014 IEEE Conference on Control Applications (CCA), IEEE, 2014, pp. 802-807.
Cruz et al., "Lift of a cable-suspended load by a quadrotor: A hybrid system approach", 2015 American Control Conference (ACC), IEEE, 2015, pp. 1887-1892.
Cruz et al., "Cable-suspended load lifting by a quadrotor UAV: hybrid model, trajectory generation, and control", Autonomous Robots, vol. 41, No. 8, pp. 1629-1643, 2017.
Palunko et al., "Trajectory generation for swing-free maneuvers of a quadrotor with suspended payload: A dynamic programmng approah", 2012 IEEE International Conference on Robotics and Automation, IEEE, 2012, pp. 2691-2697.
Kui et al., "Sliding mode control for a quadrotor slung load system", 2017 36th Chinese Control Conference (CCC), IEEE, 2017, pp. 3697-3703.
Nicotra et al., "Nested saturation control of an UAV carrying a suspended load", 2014 American Control Conference, IEEE, 2014, pp. 3585-3590.
Guerrero et al., "Ida-pbc methodology for a quadrotor UAV transporting a cable-suspended payload", 2015 International Conference on Unmanned Aircraft Systems (ICUAS), IEEE, 2015, pp. 470-476.
Guerrero et al., "Passivity based control for a quadrotor UAV transporting a cable-suspended payload with minimum swing", 2015 54th IEEE Conference on Decision and Control (CDC). IEEE, 2015, pp. 6718-6723.
Guerrero-Sanchez et al., "Swing-attenuation for a quadrotor transporting a cable-suspended payload", ISA transactions, vol. 68, pp. 433-449, 2017.
Palunko et al., "Agile load transportation: Safe and efficient load manipulation with aerial robots", IEEE robotics & automation magazine, vol. 19, No. 3, pp. 69-79, 2012.
Palunko et al., "A reinforcement learning approach towards autonomous suspended load manipulation using aerial robots", 2013 IEEE International Conference on Robotics and Automation, IEEE, 2013, pp. 4896-4901.
Faust et al., "Learning swing-free trajectories for UAVs with a suspended load", 2013 IEEE International Conference on Robotics and Automation, IEEE, 2013, pp. 4902-4909.
Faust et al., "Automated aerial suspended cargo delivery through reinforcement learning", Artificial Intelligence, vol. 247, pp. 381-398, 2017.
Shi et al., "On the autopilot design for a quadrotor during landing phase", 2016 35th Chinese Control Conference (CCC), IEEE, 2016, p. 10875-10879.
Gautam et al., "Application of guidance laws to quadrotor landing", 2015 International Conference on Unmanned Aircraft Systems (ICUAS), IEEE, 2015, pp. 372-379.
Luo et al., "A neural network based landing method for an unmanned aerial vehicle with soft landing gears", Applied Sciences, vol. 9, No. 15, pp. 2976, 2019.
Sani et al., "Automatic landing of a low-cost quadrotor using monocular vision and kalman filter in gps-denied environments", Turkish Journal of Electrical Engineering & Computer Sciences, vol. 27, No. 3, pp. 1821-1838, 2019.
Goodarzi, "Autonomous aerial payload delivery with quadrotor using varying length cable", 2016 International Conference on Advanced Mechatronic Systems (ICAMechS), IEEE, 2016, pp. 394-399.
Hoffmann et al., "Quadrotor helicopter flight dynamics and control: Theory and experiment", AIAA guidance, navigation and control conference and exhibit, 2007.
Bouadi et al., "Modeling and adaptive flight control for quadrotor trajectory tracking", Journal of Aircraft, vol. 55, No. 2, pp. 666-681, 2017.
Lee et al., "Autonomous swing-angle estimation for stable slung-load flight of multi-rotor UAVs", 2017 IEEE International Conference on Robotics and Automation (ICRA), IEEE, 2017, pp. 4576-4581.
Angelis, "Swing angle estimation for multicopter slung load applications", Aerospace Science and Technology, vol. 89, pp. 264-274, 2019.

\* cited by examiner

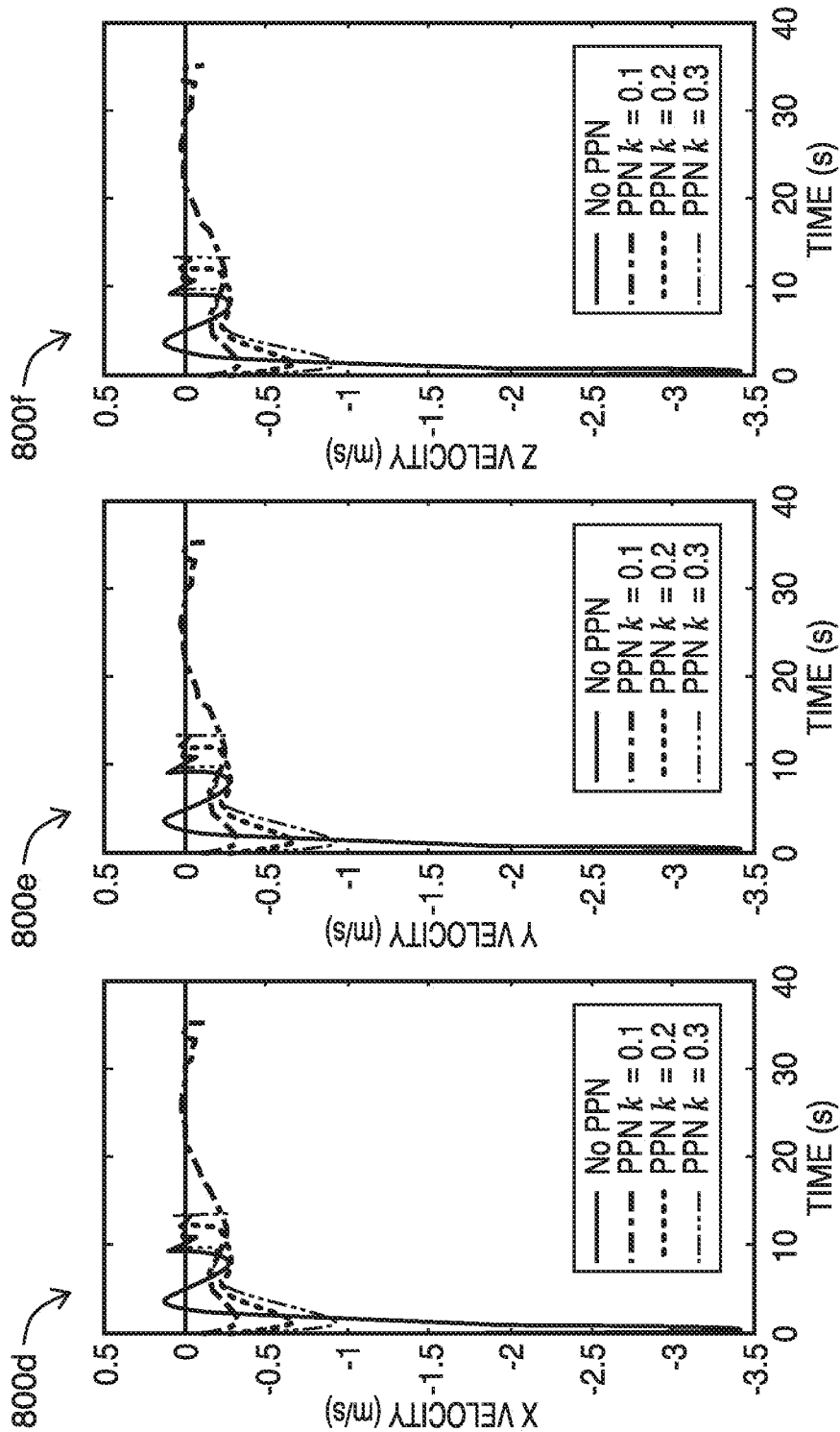

SYSTEM AND METHOD FOR AUTONOMOUS LANDING OF AN UNMANNED AERIAL VEHICLE

FIELD

The described embodiments relate to Unmanned Aerial Vehicles and, in particular, to a system and method for autonomous landing of an Unmanned Aerial Vehicle.

INTRODUCTION

In recent years, the popularity of Unmanned Aerial Vehicles (UAVs) has seen a drastic increase with UAVs becoming a mainstream in public application. The popularity of UAVs has been largely driven by their versatility, low cost, and flexible operation characteristics which have allowed UAVs to be deployed across a wide range of applications, including photography and surveying, payload delivery, and forest fire monitoring.

In general, UAVs may be categorized as one of three types: fixed-wing (e.g. airplanes), rotary-wing (e.g. helicopters), and multi-rotor (e.g. quadcopters). Multi-rotor UAVs, in particular, have received increased attention owing to the simplicity of their mechanical design, as well as their unique flight envelope properties (i.e., hover characteristics, vertical take-off and landing, and multi-directional flight properties).

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, a system for landing an unmanned aerial vehicle, the system comprising: at least one memory and at least one processor, wherein the at least one memory is operatively coupled to the at least one processor; the at least one memory storing a modified pure proportional navigation (PPN) guidance law algorithm; the at least one processor being configured to control landing of the unmanned aerial vehicle by executing the modified PPN guidance law algorithm, wherein the modified PPN guidance law algorithm comprises: determining a current position for the unmanned aerial vehicle; determining a distance of the current position from a target position; generating at least one velocity command from the determined distance, the velocity command reducing to zero as the distance reduces to zero; and controlling the unmanned aerial vehicle to maintain the velocity thereof at the velocity command, whereby as the unmanned aerial vehicle approaches the target destination, the velocity of the aerial vehicle reduces to zero.

In some embodiments, the modified PPN guidance law algorithm includes providing at least one position command for the unmanned aerial vehicle.

In some embodiments, the modified PPN guidance law algorithm determines said at least one position command from said at least one velocity command.

In some embodiments, the position and movement of the unmanned aerial vehicle is determined in a three-dimensional coordinate system, and wherein the modified PPN guidance law algorithm determines a velocity command for each dimension of the coordinate system.

In some embodiments, the position and movement of the unmanned aerial vehicle is determined in Cartesian co-ordinates as $(x, y, z)$, and the target position is also expressed in Cartesian co-ordinates as $(x_t, y_t, z_t)$.

In some embodiments, the PPN guidance law algorithm determines velocity commands for each of the Cartesian coordinates.

In some embodiments, the velocity commands are determined as incremental velocity commands in the X-axis, Y-axis and Z-axis in accordance with equations $\dot{x}_{cmd}=k_x(x_t-x)$; $\dot{y}_{cmd}=k_y(y_t-y)$; and $\dot{z}_{cmd}=k_z(z_t-z)$, respectively, wherein $k_x$, $k_y$ and $k_z$ are gain factors in each of the X-axis, Y-axis and Z-axis directions, respectively.

In some embodiments, the modified PPN guidance law algorithm is configured to generate a position command for each of the Cartesian coordinates by determining an integral of the respective velocity command.

In some embodiments, the position commands comprise incremental discrete-time domains position commands in the X-axis, Y-axis and Z-axis directions in accordance with the equations $x_{cmd,t}=x_{cmd,t-1}+\dot{x}_{cmd}\Delta t$; $y_{cmd,t}=y_{cmd,t-1}+\dot{y}_{cmd}\Delta t$ and $z_{cmd,t}=z_{cmd,t-1}+\dot{z}_{cmd}\Delta t$, respectively, wherein $x_{cmd,t-1}$, $y_{cmd,t-1}$, and $z_{cmd,t-1}$ are the position commands generated in a previous iteration of executing the PPN guidance law, and $\Delta t$ is a pre-defined time increment value for generating new incremental velocity and position commands.

In some embodiments, the UAV is further equipped with at least one sensor in communication with the at least one processor, and the at least one processor being configured to determine the co-ordinate position $(x, y, z)$ for the autonomous vehicle based on data generated by the at least one sensor.

In some embodiments, the at least one sensor comprises a Global Positioning System (GPS) module which generates GPS co-ordinates.

In some embodiments, the UAV is further equipped with a communication interface in communication with the at least one processor, and the at least one processor is configured to determine a co-ordinate position $(x_t, y_t, z_t)$ for the target position based on target information received, via the communication interface, from a flight management system.

In some embodiments, the unmanned aerial vehicle (UAV) includes a payload tethered to the UAV and the target position corresponds to a target landing destination for the payload, and wherein the modified PPN guidance law algorithm further comprises: determining a virtual target position $(x_t, y_t, z_t)'$ for the UAV based on the target position; and generating the at least one incremental velocity command based on the current co-ordinate position for the unmanned aerial vehicle and the virtual target position.

In some embodiments, the co-ordinates for the virtual target position are determined by the processor based on the target landing position in accordance with the equations $x'_t=x_t$, $y'_t=y_t$ and $z'_t=z_t+L$, wherein L defines the length of the tether, whereby when the unmanned aerial vehicle reaches the virtual target position, the unmanned aerial vehicle will have zero velocity and will be above the target destination.

In some embodiments, the at least one velocity command comprises velocity commands in the X-axis, Y-axis and Z-axis directions in accordance with the equations $\dot{x}_{cmd}=k_x(x'_t-x)$; $\dot{y}_{cmd}=k_y(y'_t-y)$; and $\dot{z}_{cmd}=k_z(z'_t-z)$.

In some embodiments, the system further includes a position controller and the position controller including an X-Y position controller and an altitude controller, the PPN guidance law algorithm supplying the X-Y position controller with at least one of velocity commands and position commands for the X and Y directions, and supplying the altitude controller with at least one of a velocity command and a position command for the Z direction.

In some embodiments, the system further includes an attitude controller having an input connected to the X-Y position controller, for receiving Euler angles ($\theta_d$, $\emptyset_d$, $\Psi_d$) corresponding to pitch, roll and yaw directions and generating corresponding actuation torques [$\tau_\varphi$, $\tau_\emptyset$, $\tau_\Psi$].

In some embodiments, the unmanned aerial vehicle includes a plurality of propellers, and wherein the system includes a control mixer connected to the attitude controller for receiving a thrust signal, T, and to the altitude controller, for receiving the corresponding actuation torques [$\tau_\varphi$, $\tau_\emptyset$, $\tau_\Psi$], the control mixer generating rotational speed values ($\sigma$) for each of the propellers of the unmanned aerial vehicle.

In some embodiments, the unmanned aerial vehicle has four propellers, and the control mixer determines rotational speed values (o) for each of the four propellers of the quadrotor UAV ([$\sigma_1$, $\sigma_2$, $\sigma_3$, $\sigma_4$]).

In some embodiments, the modified PPN guidance law algorithm determines position commands for the X, Y and Z directions and supplies these position commands to the X-Y position controller and to the altitude controller.

In accordance with one aspect of this disclosure, which may be used alone or in combination with any other aspect, there is provided a method for landing an unmanned aerial vehicle (UAV) using a modified PPN guidance law algorithm, comprising: determining a current position for the unmanned aerial vehicle; determining a position for a target position; generating at least one velocity command based on a distance between the current co-ordinate position for the unmanned aerial vehicle and the target position; generating at least one velocity command from the determined distance; reducing the velocity command to zero as the distance reduces to zero; and controlling the unmanned aerial vehicle to maintain the velocity thereof at the velocity command, whereby as the unmanned aerial vehicle approaches the target position, the velocity of the aerial vehicle reduces to zero.

It will be appreciated by a person skilled in the art that a system or method disclosed herein may embody any one or more of the features contained herein and that the features may be used in any particular combination or sub-combination.

These and other aspects and features of various embodiments will be described in greater detail below.

DRAWINGS

A preferred embodiment of the present invention will now be described in detail with reference to the drawings, in which:

FIG. 8D is a plot showing the velocity trajectory of a simulated quadrotor UAV, along the "X" co-ordinate axis, as a function of time, during the translational descent;

FIG. 8E is a plot showing the velocity trajectory for a simulated quadrotor UAV, along the "Y" co-ordinate axis, as a function of time, during the translational descent;

FIG. 8F is a plot showing the velocity trajectory for a simulated quadrotor UAV, along the "Z" co-ordinate axis, as a function of time, during the translational descent;

DESCRIPTION OF VARIOUS EMBODIMENTS

Figure 1:
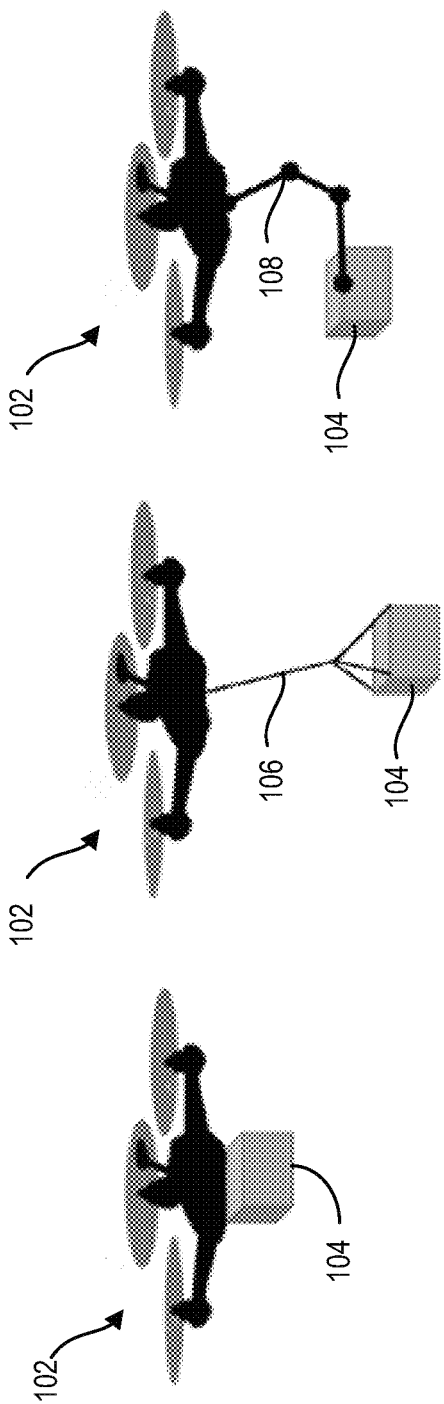
FIG. 1A is a schematic image of an example quadrotor Unmanned Aerial Vehicle (UAV) with a rigidly connected payload.
FIG. 1B is a schematic image of an example quadrotor UAV with a cable slung payload.
FIG. 1C is a schematic image of an example quadrotor UAV with a manipulator-arm carried payload.

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

As explained in the background section, in recent years, UAVs have found increased, wide-spread application across multiple industry sectors. One example application has been for delivery of payloads (e.g., packages) between various locations. The growing use of UAVs for payload delivery has been largely driven by popular consumer demand for deliverable goods, as well as increasing desire by companies to extend the reach of their package delivery services.

Referring now to FIGS. 1A-1C, which schematically illustrate various example methods by which payloads can be attached to a UAV for payload delivery. As shown, a payload 104 can be attached to a UAV 102 either by a rigid connection to the UAV body (FIG. 1A), attachment through a cable or tether 106 (FIG. 1B), or attachment through a manipulator-arm 108 (FIG. 1C).

The rigid configuration illustrated in FIG. 1A is the most common attachment configuration, and is regarded as the most intuitive and simplest method by which a payload can be attached to a UAV. Yet, despite the simplicity of the design, a rigid configuration is not easily adapted to carrying different types of payloads. For example, UAVs having a rigid configuration are typically either adapted to carry light payloads or heavy payloads. Once the configuration is fixed (e.g., to carry a light or heavy payload), there is less flexibility to re-adapt the configuration to carry different weights of payload. Additionally, the rigid configuration is not always ideally suited for carrying heavier payloads. For example, when attaching heavier payloads to conventional multi-rotor UAVs, the heavy payload can distort the mass and rotational inertia of the UAV. In particular, because multi-rotor UAVs must rotate to change direction, changing the UAVs rotational inertia may, in turn, limit the UAVs maneuverability and flight envelope. In various cases, rigidly connected payloads may also bring inconvenience in physical landing of UAVs at desired destination locations. For example, landing UAVs on steep ground inclinations may be difficult when a payload is rigidly attached to the UAV body. Still further, in environments having large amounts of obstacles, it may be unsafe or risky to fly the UAV to landing targets which are closely surrounded by obstacles.

In view of the foregoing, the cable slung payload (FIG. 1B) and manipulator arm (FIG. 1B) configurations have been proposed as alternative configurations to mitigate the drawbacks of the rigid design configuration. In particular, in a cable slung payload configuration, the payload is attached to the UAV body using a cable or tether. This design allows the payload to behave similar to a swinging pendulum in transit flight. The cable slung payload design can improve the UAV's mission efficiency by allowing the UAV to deliver payloads without necessitating UAV landing. For example, using a cable slung payload, a UAV can deliver a payload by hovering over a landing zone, without completing a full landing and takeoff procedure. A cable slung payload design can also facilitate transport of larger objects which may not otherwise physically fit on the UAV body. In some cases, multiple UAVs may be connected together (e.g., using cables) to increase the maximum cable slung payload mass which can be carried by the UAV. In view of the foregoing, the cable slung payload configuration has been suggested as the most efficient means for carrying-out payload transport missions.

The operational mechanics of a UAV with a cable slung payload is typically examined by segmenting the UAV's payload transport mission into three main segments: 1) takeoff, 2) cruise/trajectory tracking, and 3) landing. Takeoff involves take-off from ground, and proceeding to lift the payload smoothly off the ground using a tether. Cruise/trajectory tracking involves the main segment of the transport mission (e.g., flight between points). Landing of the UAV involves lowering the payload to the ground.

In recent years, the majority of research has been directed to enhancing the stability of the takeoff and cruise/trajectory phases of the flight mission. In particular, this research has proposed various autonomous position controllers which can stabilize a UAV having a cable slung payload during take-off and cruising, often to explicitly minimize the swinging motion of the payload. However, to date, the landing phase of UAVs with cable slung payloads has not been well studied. It has been appreciated, however, that the landing phase for UAVs with cable slung payloads is a critical phase to ensure that there are no hard impact landings as the payloads touchdown on ground (i.e., which may otherwise result in damage to sensitive or fragile payloads).

In view of the foregoing, embodiments disclosed herein relate to a method and system for autonomous landing of a UAV having a cable slung payload.

In accordance with various teachings provided herein, the autonomous landing of UAVs with cable slung payloads is performed using a modified Pure Proportional Navigation (PPN) guidance law. The modified PPN guidance law is used to generate landing position commands for a UAV position controller. In particular, the modified PPN guidance law is configured to generate position commands which allow the position controller to control the UAV to implement smooth and stable landing trajectories which are defined by low acceleration and soft touchdown, and without significant compromise to landing time. The proposed PPN guided position controllers may be advantageously implemented using existing UAV position controller hardware without the necessity for additional or upgraded control hardware. The PPN guided position controller may also advantageously be used to guide UAV landing without feedback information in respect of payload state information (e.g., payload position, etc.). Accordingly, this avoids the need to include additional hardware (e.g., sensors) to the UAV to determine payload state information, which may not be always practical or economically feasible.

Figure 2:
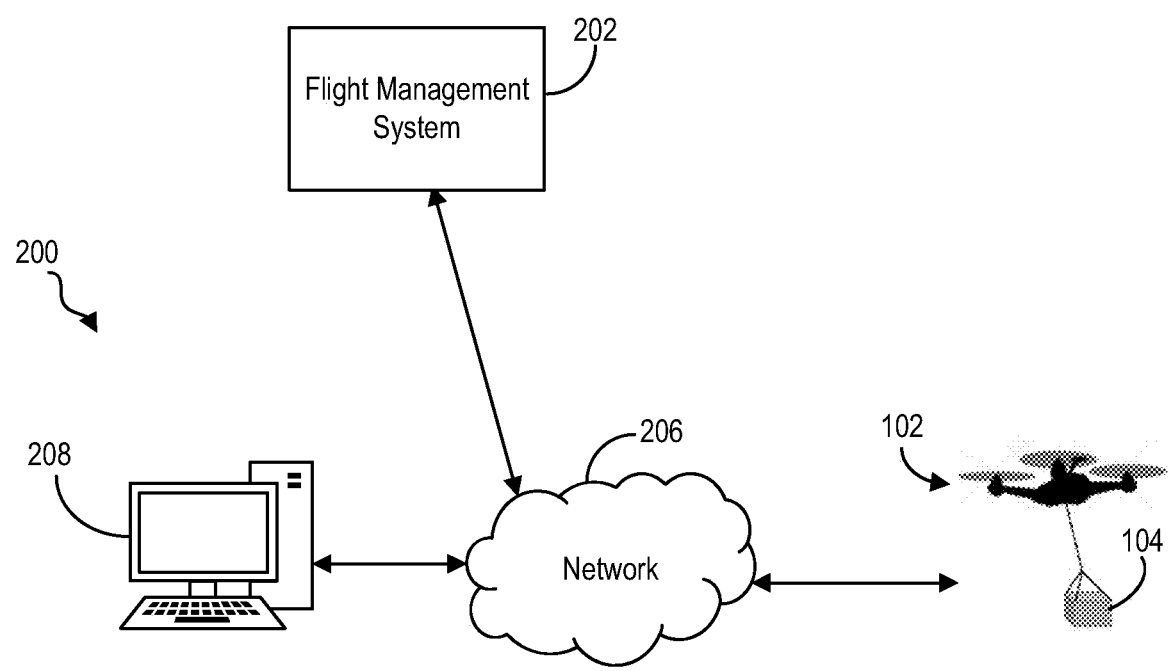
FIG. 2 is a simplified schematic diagram of a system for communication between a flight management system and one or more UAVs.

Referring now to FIG. 2, there is shown is a simplified schematic diagram of a system 200 for autonomous control of a UAV, according to some embodiments. The system 200 provides the environment in which the methods described herein generally operate.

As shown, the system 200 includes a flight management system 202 in data communication with the UAV 102. In various cases, the UAV 102 may be, for example, a multirotor UAV (e.g., quadrotor UAV).

The communication between the flight management system 202 and the UAVs 102a-102c may occur over a communication network 206. Communication network 206 may be, for example, one or more of a wireless personal area network such as a Bluetooth™ network, a wireless local area network such as the IEEE 802.11 family of networks, a mesh network, a cellular communication network, or a satellite communication network.

In various cases, the UAV 102 may be used for delivery of articles, parcels, or packages between various locations, or between various parties. For example, as shown in FIG. 2, the UAV 102 may carry a cable slung payload 104 which is tethered to the UAV body.

In at least some embodiments described herein, the flight management system 202 may be configured to control the operation of one or more of the UAVs 102a-102c. For example, the flight management system 202 may be configured to send commands, via communication network 206, to the UAVs 102a-102c. For example, the flight management system 202 may transmit commands to a UAV to navigate to a location for picking-up or dropping-off a payload 104. In some cases, the navigational command can be expressed as Global Positioning System (GPS) coordinates, or coordinates expressed relative to a known reference frame mutually known to both the flight management system 202 and the UAV 102. In other cases, the flight management system 202 may also transmit flight path trajectory information to the UAV for arriving at a destination location. In other embodiments, the flight management system 202 may also be configured to request and receive information from the UAVs 102a-102c. The information may be in respect of the status and location of each UAV.

The system 200 may also include a computing device 208. The computing device 208 may be operated, for example, by a UAV operator. In examples provided herein, the flight management system 202 may be provided, and otherwise operable, on the computing device 208.

Figure 3A:
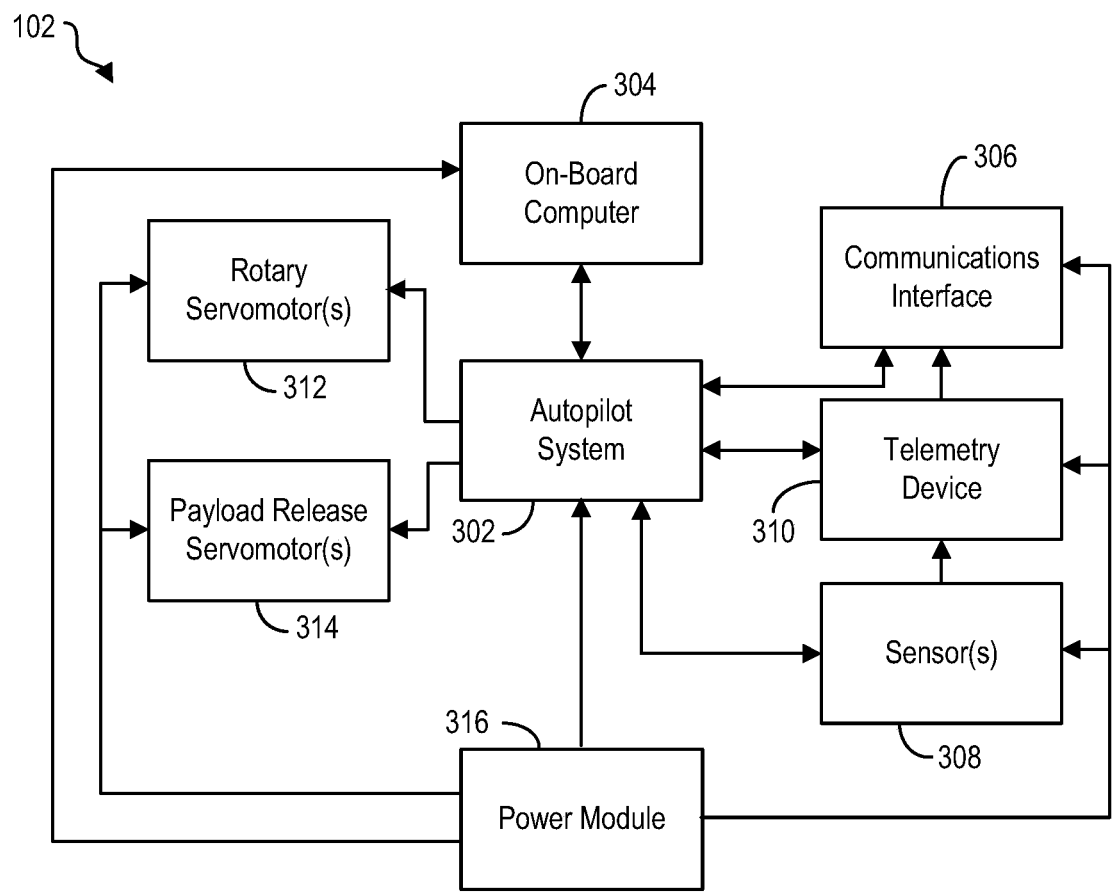
FIG. 3A is a simplified block diagram of an example UAV.

Referring now to FIG. 3A, there is shown a simplified block diagram of an example UAV 102. As shown, the UAV 102 may include an autopilot system 302 in data communication with an on-board computer 304, a communications interface 306, one or more sensors 308, a telemetry device 310, one or more rotary servomotors 312 and a payload release servomotor 314.

Autopilot system 302 may be a system for controlling the trajectory and motion of the UAV 102. Generally, an autopilot is required to receive a pre-planned route, use sensors 308 to determine position, orientation and velocity parameters of the UAV 102, and to control rotary motors 312 and other control devices on the UAV 102 to control the UAV 102 and cause it to follow the preplanned route. The autopilot 302 is also capable of receiving and acting on changes to the route, and detecting and responding to adverse events, e.g. unexpected weather conditions, that may require changes to the route. In at least some embodiments, the autopilot 302 controls the UAV 102 based on navigation and action commands received from the flight management system 202. In various embodiments provided, as explained herein, the autopilot 302 is also configured to control the UAV to perform a landing maneuver at a destination location. The landing maneuver may allow the UAV to drop a cable-slung payload (e.g., package) at the destination location. In various cases, the autopilot system 302 may execute a position controller algorithm which allows the autopilot to control the UAV to perform the landing maneuver. In at least some embodiments, the autopilot system 302 can also execute mathematical models, which model the quadrotor's unique dynamic and kinematic behavior. In particular, the output of the dynamic and kinematic models can be used to configure the position controller to execute the controlled landing maneuvers.

The autopilot system 302 is also configured to receive commands from the flight management system 202 (operating on the computing device 208) via the network 206, using communications interface 306. In other cases, the autopilot system 302 may be configured to transmit information to the flight management system 202 in respect of the operation of the autopilot 302 and/or the on-board computer 304.

On-board computer 304 is configured to provide a platform for implementing high-level controls and algorithms. In particular, in embodiments provided herein, the on-board computer 304 may be configured to run a Pure Proportion Navigational (PPN) guidance law algorithm which generates position and velocity commands for effecting an autonomous landing maneuver for the UAV. The position and velocity commands generated by the PPN guidance law may be transmitted from the on-board computer 304 to the autopilot system 302. The autopilot system 302 may then execute a position controller algorithm, using the position and velocity commands, to effect the controlled landing maneuver. In at least some embodiments, the UAV 102 may not include an on-board computer 304, and the PPN guidance law algorithm may be directly implemented on the autopilot system 302. In still other embodiments, the on-board computer 304 may execute each of the PPN guidance law, the position controller algorithm and the dynamic and kinematic models for the quadrotor.

Communications interface 306 may be configured to send and receive data. Communications interface 306 may, for example, comprise a wireless transmitter or transceiver and antenna (e.g., Radio Control (R/C) transmitter or transceiver). In some embodiments, the communications interface 306 may receive information and data from flight management system 202. In other cases, the communications interface 306 can transmit instructions and/or data to flight management system 202. Accordingly, communications interface 306 can be configured to provide duplex communication.

Sensors 308 may be on-board sensors which are configured to measure various parameters. By way of non-limiting examples, sensors 308 may include temperature sensors, current sensors, altitude sensors, GPS devices, barometers, and/or Inertial Measurement Units (IMUs). In some cases, data generated by sensors 308 may be transmitted to the telemetry device 310, or otherwise, to the autopilot system 302 or on-board computer 304.

Telemetry device 310 can couple to one or more sensors 308 to collect and monitor various parameter information for the UAV 102. Sensor data collected by telemetry device 310 may be transmitted, via communications interface 306, to the flight management system 202 to allow the flight management system to monitor changes in UAV system parameters (e.g., position and location), and to the autopilot 302.

Rotary servomotors 312 may be one or more motors which are configured to drive rotary blades for driving the UAV to take-off, cruise and land. The UAV 102 may include any number of rotary servomotors 312. For instance, in at least some embodiments, the UAV 102 may be a quadrotor UAV and may include four servomotors 312 for driving four separate rotary blades. In at least some embodiments, each servomotor 312 may be provided with a separate electronic speed controller (EDC) to control the motor speed based on an input signal received from autopilot system 302.

Payload release servomotor 314 may be a servomotor which is configured to actuate (e.g., activate) an attachment release mechanism (e.g., a hook) which releases a tethered load coupled to the UAV 102. The servomotor 314 may be driven by commands received from the autopilot system 302 upon arriving at a drop-off destination. In some cases, the servomotor is actuated by a set of Pulse Width Modulated (PWM) commands generated by autopilot system 302.

Power module 316 is configured to provide power to the various components of the UAV 102. The power module 316 may be, for example, an avionics battery capable of supplying power to the UAV 102 for a determined period of time. In some cases, the power module 316 may include one or more power regulation devices which can regulate the amount of voltage or current delivered from an avionics battery to various components of the UAV 102.

Figure 3B:
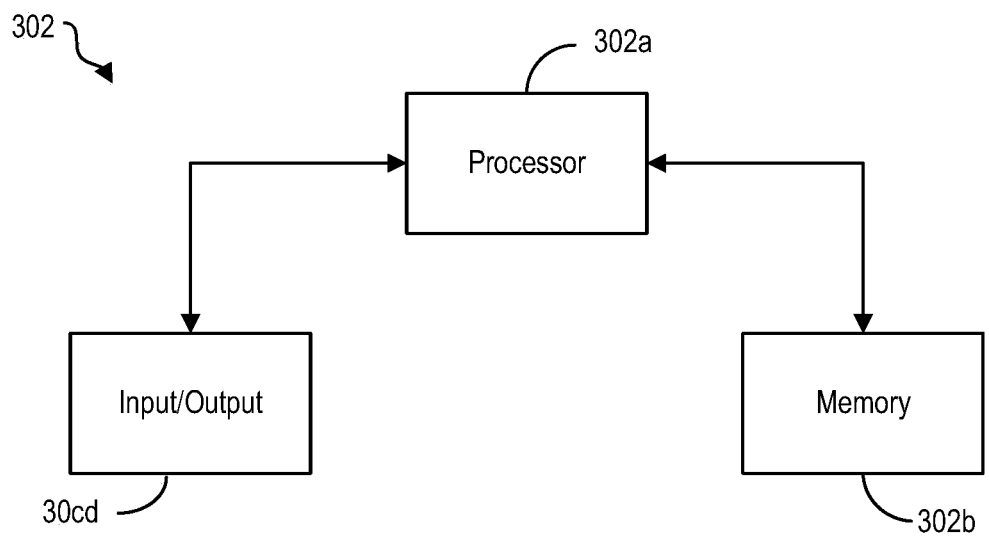
FIG. 3B is a simplified block diagram of an example UAV autopilot system.

Referring now to FIG. 3B, there is shown a simplified block diagram of an example autopilot system 302.

As shown, the autopilot 302 may include a processor 302a in communication with a memory 302b and an input/output module 302c.

Processor 302a may be a computer processor, such as a general purpose microprocessor. In some other cases, processor 302a may be a field programmable gate array, application specific integrated circuit, microcontroller, or other suitable computer processor.

Processor 302a is coupled to memory 302b. Memory 302b may include both volatile and non-volatile memory. Non-volatile memory stores computer programs consisting of computer-executable instructions, which may be loaded into volatile memory for execution by processor 302a as needed. It will be understood by those of skill in the art that references herein to the autopilot 302 as carrying out a function or acting in a particular way imply that processor 302a is executing instructions (e.g., a software program) stored in memory 302b and possibly transmitting or receiving inputs and outputs via one or more interface. Memory 302b may also store data input to, or output from, processor 302a in the course of executing the computer-executable instructions. In various cases, as explained herein, the memory 302b may store a stabilized position controller algorithm (e.g., a Proportional-Integral-Derivative (PID) controller algorithm) which is used by autopilot system 302 to control the position trajectory of the UAV 102. The memory 302b may also store mathematical models for the quadrotor UAV's dynamic and kinematic behavior.

The input/output module 302c may be configured to send and receive data to and from the UAV on-board computer 304, as well as other components of the UAV 102.

Figure 3C:
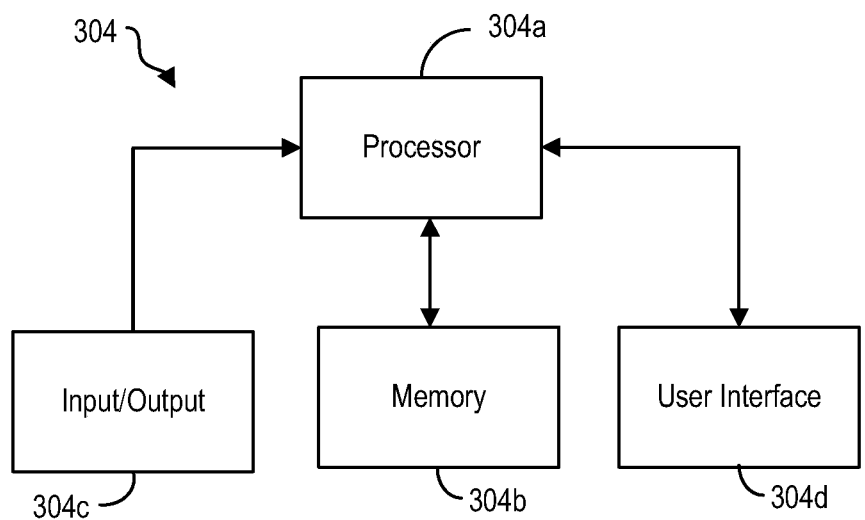
FIG. 3C is a simplified block diagram of an example UAV controller.

Referring now to FIG. 3C, there is shown a simplified block diagram of the on-board computer 304. Similar to autopilot system 302, on-board computer 304 can include a processor 304a in communication with memory 304b. Again, reference herein to the on-board computer 304 as carrying out a function or acting in a particular way implies that processor 304a is executing instructions (e.g., a software program) stored in memory 304b and possibly transmitting or receiving inputs and outputs via one or more interface. In various cases, as explained herein, memory 304b can store instructions for executing an algorithm for a modified PPN guidance law, which can be executed by the processor 304a.

Processor 304a may also be in communication with an input/output module 304c and a user interface 304d (e.g., a display or other device for receiving user inputs).

While the autopilot 302 and on-board computer 304 have been exemplified herein as separate hardware components, it will be appreciated that, in other cases, the autopilot 302 and on-board computer 304 may be integrated into a single hardware system. For example, a single processor can be used for performing the combined functions of the autopilot and on-board computer.

Figure 3D:
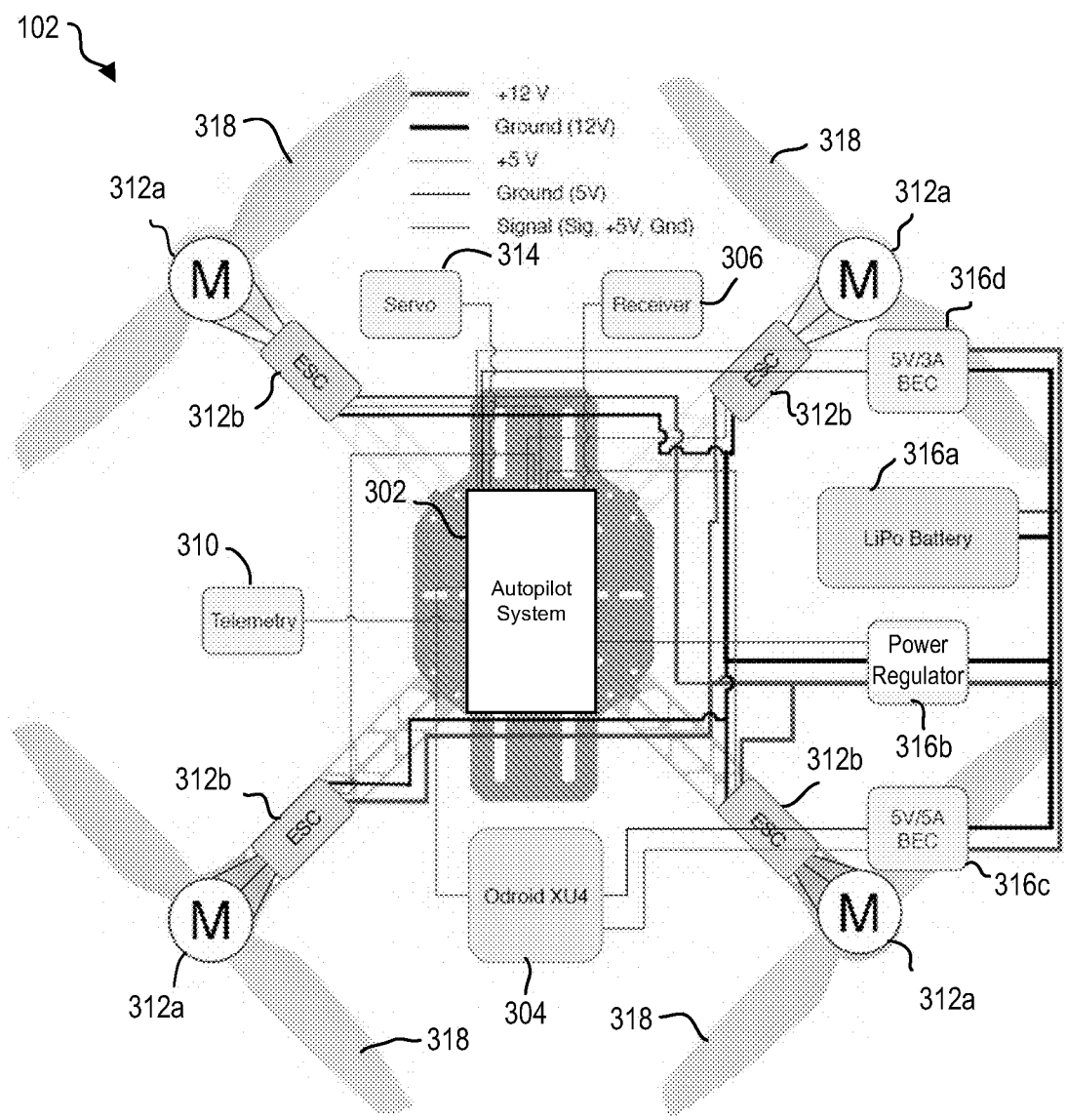
FIG. 3D is a schematic representation showing components of an example quadrotor UAV.

Referring now to FIG. 3D, there is shown a schematic representation of components of an example quadrotor UAV 102.

As shown, the example quadrotor UAV 102 shown in FIG. 3D includes a on-board computer 304 (e.g., an Odroid XU-4 on-board computer running operating software and a Robot Operating System (ROS)) in data communication with an autopilot system 302 (e.g., a Pixhawk autopilot system running a PX4 flight stack firmware). Communication between the autopilot 302 and on-board computer 304 may be enabled using a serial connection cable which allows fast and reliable communication between the two components and allowing the on-board computer 304 to receive sensor measurements and state estimates from the autopilot 302, and to transmit position information and commands to the autopilot 302.

The autopilot system 302 is coupled to four different rotary servomotors 312a, which drive rotary blades 318. In at least some example cases, the servomotors 312a can be configured as brushless motors. An electronic speed controller (ESC) 312b is coupled between the autopilot 302 and the brushless motors 312a to control the motors 312a in accordance with digital input signals received from autopilot 302.

The autopilot system 302 may be also connected to the payload release servomotor 314, as well as the communications interface or receiver 306, and the telemetry device 310.

The power module 316 for the UAV 102 includes a lithium polymer (LiPO) battery 316a, a power regulator 316b and battery eliminator circuits (BECs) 316c, 316d. The LiPO battery 316a provides power to various systems of the UAV 102. The current from the battery 316a is divided between the power regulator 316b and the BECs 316c, 316d. The power regulator 316b provides electricity to the ESCs 312b and also regulates voltage power to the autopilot 302. The BEC 316c is used to regulate voltage supply to the on-board computer 304 to avoid shut down during flight, while the BEC 316d is used to provide sufficient power to the servomotor 314 which operates the payload release mechanism.

Figure 4:
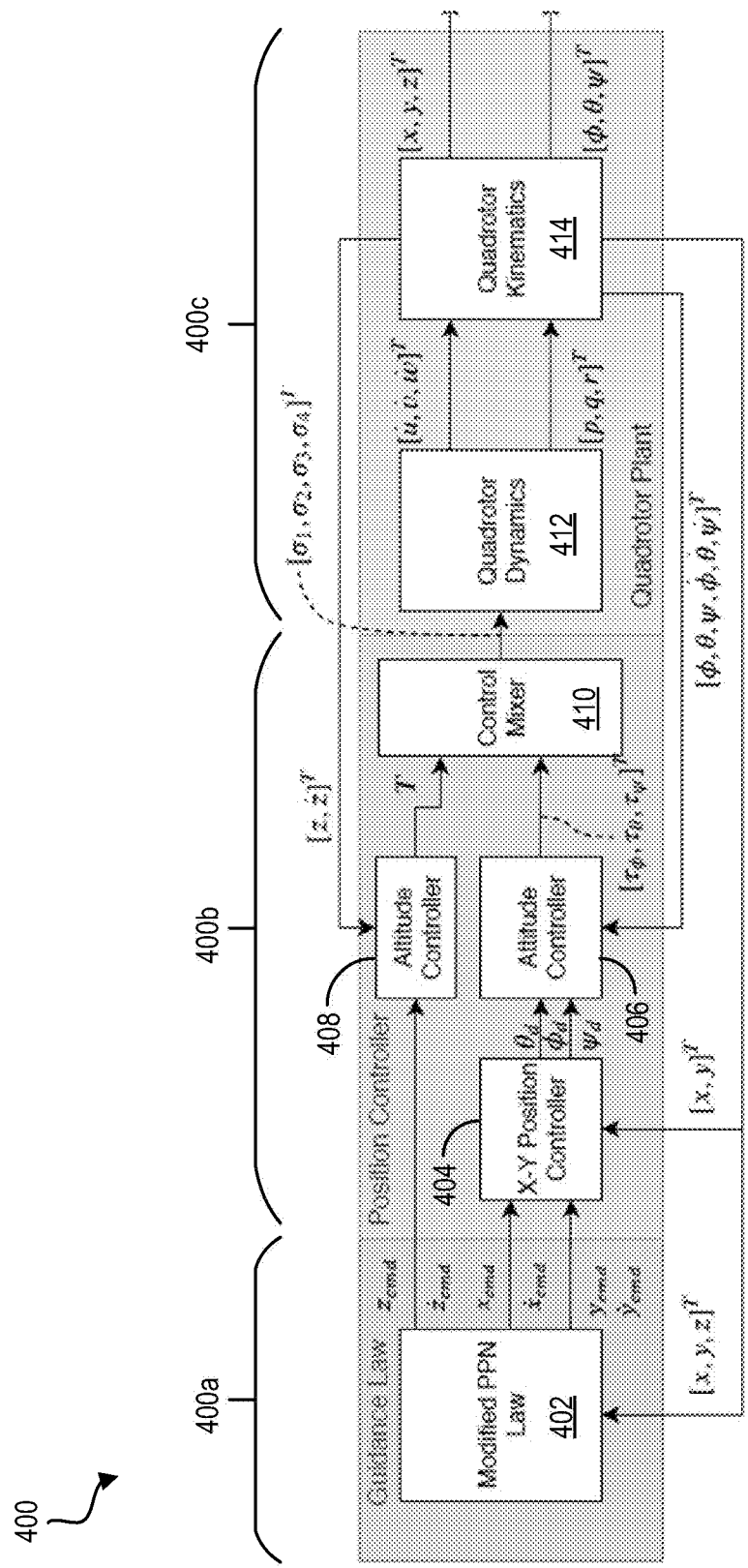
FIG. 4 is a simplified block diagram showing a process flow for a modified Pure Proportional Navigation (PPN) guidance law implementation on a UAV, according to some example embodiments.

Referring now to FIG. 4, there is shown a process flow for a method 400 for implementing a modified Pure Proportional Navigation (PPN) guided position controller, in accordance with embodiments provided herein. In particular, the PPN guided position controller is used by the autopilot system 302 to effect a landing maneuver for a UAV at a stationary landing target. In some cases, the UAV may also have a cable slung payload which requires "dropping-off" at the stationary landing target. Method 400 can be implemented by the processor 302a of the autopilot 302 and the processor 304a of the on-board computer 304.

As shown, at 400a, a modified PPN guidance law algorithm 402 is executed to generate incremental position commands along the X, Y and Z co-ordinate axes (e.g., $x_{cmd}$, $y_{cmd}$, $z_{cmd}$), as well as incremental velocity commands along the three co-ordinate axes (e.g., $\dot{x}_{cmd}$, $\dot{y}_{cmd}$, $\dot{z}_{cmd}$). It will be understood that the algorithm 402 may just generate incremental velocity commands along the three co-ordinate axes (e.g., $\dot{x}_{cmd}$, $\dot{y}_{cmd}$, $\dot{z}_{cmd}$), and any required position command may be determined as an integral of the velocity command. As detailed below, this can be determined in the discrete time domain.

The incremental velocity commands, generated by the guidance law 402, drive the quadrotor velocity to zero as the quadrotor approaches a landing target. This, in turn, allows the quadrotor to effect a smooth landing. As explained herein, an iterative method is used to incrementally vary the velocity command based on the current position of the UAV (e.g., $[x, y, z]^T$) relative to the landing position. More specifically, at a given instance in time, the PPN law 402 compares the current position of the UAV to the desired landing position. The PPN law 402 then determines the position error between the current and desired landing position. Based on the position error, the PPN law 402 may generate an incremental velocity command, as explained in further detail herein. The velocity command is executed by the UAV for an increment of time (Δt). Once the increment of time (Δt) has lapsed, the PPN law 402 re-evaluates the position of the UAV using an updated UAV co-ordinate position (e.g., $[x, y, z]^T$) received through a feedback loop. In iterative fashion, the PPN law 402 determines an "updated position error" based on the updated UAV co-ordinate position, and determines an updated velocity command based on the updated position. The updated velocity command is again executed for a pre-determined increment of time (Δt). The method is then continuously re-iterated using updated positions for the UAV, which are generated at time increments (Δt). As the UAV approaches the landing target (e.g., the position error decreases), the incremental velocity commands gradually decrease to zero to allow the UAV to effect a smooth landing. The method re-iterates until the position error is zero, and the velocity of the UAV is driven to zero. As explained in further detail herein, the PPN guidance law 402 is also able to generate incremental position commands for the UAV based on the incremental velocity commands. The incremental position commands allow the autopilot 302 to guide the UAV to the landing target.

In various cases, the co-ordinates for the landing target location are received from the flight management system 202, or otherwise, pre-stored in memory 302b of autopilot 302. In general, as used herein, the X, Y and Z co-ordinate axes are defined with respect to a North-East-Down (NED) reference frame (Fr), which is assumed to be an inertial reference frame that is fixed to a flat and non-rotating earth (i.e., a fixed inertial frame), and having an origin located at a desired point on the ground.

At 400b, the position and velocity commands generated by the guidance law at 400a are fed into a stabilized position controller. As used herein, the term "position controller" broadly refers to any closed-loop mechanism employing feedback which is able to stably implement velocity and position commands received from the PPN law 402. As shown, the position controller may include an X-Y position controller 404 and an attitude controller 406, which receive the X and Y position commands ($x_{cmd}$, $y_{cmd}$) and velocity commands ($\dot{x}_{cmd}$, $\dot{y}_{cmd}$) and an altitude controller 408, which receives the Z position command ($z_{cmd}$) and velocity command ($\dot{z}_{cmd}$). In at least some embodiments, the position controller 400*b* may be configured as a Proportional-Integral-Derivative (PID) controller.

As shown at 400*b*, the X-Y position controller 404 receives the X and Y velocity and position commands ($\dot{x}_{cmd}$, $x_{cmd}$, $\dot{y}_{cmd}$, $y_{cmd}$), from the PPN guidance law 402, and generates corresponding desired or commanded Euler angles ($\theta_d$, $\O_d$, $\Psi_d$) corresponding to pitch, roll and yaw directions, which direct orientation of the UAV in accordance with the X and Y position and velocity commands. It will be appreciated that, in the context of a quadrotor UAV, "pitch" refers to tilting the UAV about the Y-axis, "yaw" refers to clock-wise and anti-clockwise rotation about the Z-axis, and "roll" refers to rotation about the X-axis. The Euler angles generated by the controller 404 are fed into the attitude controller 408, which converts the angles into corresponding actuation torques [$\tau_\phi$, $\tau_\Theta$, $\tau\Psi$] (i.e., torques required to rotate the UAV in accordance with the required or commanded pitch, roll and yaw angles). The actuation torques are then fed into a control mixer 410. Similarly, the Z velocity and position commands ($\dot{z}_{cmd}$, $z_{cmd}$) are fed into the altitude controller 408 to generate the thrust (e.g., throttle) parameter ["T"]), which is used to vary the vertical position of the UAV. The thrust parameter is also fed into the control mixer 410. Based on the inputs from the attitude controller 406 and altitude controller 408, the control mixer 410 is configured to generate rotational speed values ($\sigma$) for each of the four propellers of the quadrotor UAV (e.g., [$\sigma_1$, $\sigma_2$, $\sigma_3$, $\sigma_4$]), which can be used to control the UAV rotary servomotors 312. The rotational speed values ($\sigma$), generated by the control mixer 410, are transmitted to the autopilot system 302 to control the propeller speeds. It will be appreciated that by varying the speeds of each of the four propellers at different rates—the commanded velocities along the three co-ordinate axes (e.g., $\dot{x}_{cmd}$, $\dot{y}_{cmd}$, $\dot{z}_{cmd}$), and pitch, roll, yaw and vertical angles of the UAV quadrotor can be adjusted.

At 400*c*, the outputs of the position controller (e.g., the rotational speed values) are also fed into a mathematical model of the quadrotor plant. The quadrotor plant includes a quadrotor dynamics module 412 and a quadrotor kinematic module 414. The quadrotor dynamics module 412 comprises a mathematical modelling of the quadrotor's dynamic behavior. The dynamics module 412 receives the rotational speed values ($\sigma$) generated by the control mixer 410, and determines the resulting change in rotational motion of the UAV (e.g., as a result of the rotational speeds). In particular, the dynamic module 412 determines the roll rate (p), pitch rate (q) and yaw rate (r) (i.e., [p, q, r]$^T$) of the UAV body, as a result of the effecting the rotational propeller speeds ([$\sigma_1$, $\sigma_2$, $\sigma_3$, $\sigma_4$]). The roll rate (p), pitch rate (q) and yaw rate (r) may be defined as the rate of change in the UAV's angular position in the roll, pitch and yaw directions, respectively, with respect to a body-fixed frame (e.g., a frame defined relative to the UAV body). This may be contrasted to [$\dot{\O}$, $\dot{\theta}$, $\dot{\Psi}$]$^T$, which expresses the rate of change in the UAV's angular position in a fixed inertial frame (e.g., a frame defined relative to a desired point on ground). In various cases, [p, q, r]$^T$=$T_{Matrix}$*[$\dot{\O}$, $\dot{\theta}$, $\dot{\Psi}$]$^T$, wherein $T_{Matrix}$ is a transform matrix which relates the UAV's rate of change, in angular position, in the fixed inertial frame [$\dot{\O}$, $\dot{\theta}$, $\dot{\Psi}$]$^T$ to the body-fixed frame [p, q, r]$^T$. The dynamics module 412 also determines the resulting change in "translation motion" of the UAV, also resulting from the propeller speeds. More specifically, the dynamics module 412 determines the rate of change in the UAV's velocity (e.g., acceleration) in the body-fixed frame along the X-axis (u), Y-axis ($\dot{v}$) and Z-axis ($\dot{w}$) (i.e., [$\dot{u}$, $\dot{v}$, $\dot{w}$]$^T$)). In particular, the UAV velocity in the X, Y and Z directions ([u, v, w]$^T$) is defined as the rate of change in the UAV's position, in the X, Y and Z directions in the body-fixed frame. This is in contrast to [$\dot{x}$, $\dot{y}$, $\dot{z}$]$^T$, which expresses the UAV's velocity using a fixed inertial frame. In various cases, the UAV's velocity in the fixed inertial frame can be related to the UAV's velocity in the body-fixed frame using a transform matrix. The parameters generated by the dynamic module 412 are then fed into the quadrotor kinematics module 414. The quadrotor kinematics module 414 includes kinematic modelling equations for the quadrotor UAV. The kinematic module 414 receives the rotational motion parameters (i.e., [p, q, r]$^T$) and the translational motion parameters (i.e., [$\dot{u}$, $\dot{v}$, $\dot{w}$]$^T$), and based on these parameters, determines, for the discrete increment of time ($\Delta$t) an updated co-ordinate position for the UAV in the fixed inertial frame (i.e., [x, y, z]$^T$) and an updated rotational for the UAV (i.e., [$\theta$, $\O$, $\Psi$]$^T$) (e.g., the co-ordinate and rotational positions which result from the rotational and translational motion parameters). The position co-ordinates are fed back to the modified PPN law 402 to allow the PPN law to re-evaluate the current position of the UAV, and to generate new position and velocity commands. In various cases, the X, Y ([x, y]) position co-ordinates may be also fed back into the X-Y position controller 404, to allow the controller to stabilize and control the position of the UAV in the X and Y directions. The kinematics module 414 can also generate an instantaneous velocity of the UAV in the Z-direction ($\dot{z}$), which can be fed back to the altitude controller 408, along with the Z co-ordinate positon (z), to also allow the altitude controller 408 to stabilize the Z-position of the UAV. In still further cases, the kinematic module 414 can generate rotational velocities in the roll, pitch and yaw directions ([$\dot{\theta}$, $\dot{\O}$, $\dot{\Psi}$]), which are fed back to the altitude controller 408, along with the updated rotational position [$\theta$, $\O$, $\Psi$]$^T$. In particular, these values may allow the altitude controller to stabilize the rotational motion of the UAV. Additionally, the kinematic module 414 may generate and supply velocity values for the ([x, y]) directions.

As explained herein, the use of a modified PPN guidance law algorithm 402 in conjunction with a position controller, as shown in FIG. 4, allows for control of a quadrotor UAV, with a cable-slung payload, to achieve a smooth landing trajectory and a soft touchdown at a stationary target. This, in turn, has the effect of preventing hard touchdowns, which may otherwise damage the carried payload.

Figure 5A:
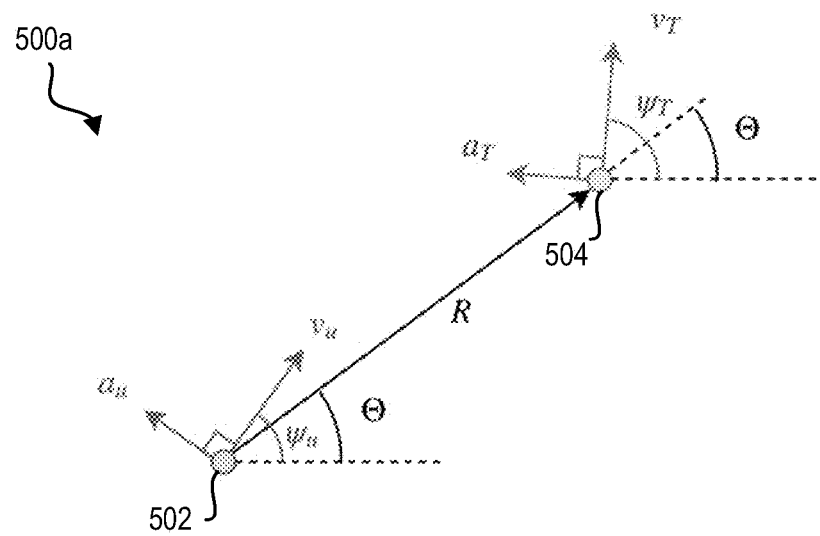
FIG. 5A is a schematic representation showing a classical PPN guidance law definition.

Referring now to FIG. 5A, there is shown a schematic illustration of a classical 2-D PPN guidance law definition 500*a*. The classical 2-D PPN guidance law 500*a* serves as a basis for developing the modified guidance PPN law which is applicable to landing a quadrotor UAV.

In particular, the classical 2-D PPN guidance law is used to guide a moving object towards a moving or stationary target. As shown, the classical definition assumes that the velocity of both the UAV 502 ($v_u$) and the landing target 504 ($v_t$) are constant. If the landing location is assumed to be stationary, then the velocity of the landing target is set zero ($v_t$=0). The line of sight angle between the UAV and the target location can be defined as the variable ($\theta$), while the heading angle of the UAV can be denoted as ($\Psi_u$) and the heading angle of the target denoted as ($\Psi_t$). The distance between the UAV 502 and landing target 504 is referred to as the range (R). The acceleration of the UAV ($a_u$) and target ($a_t$) act perpendicularly to the velocities. Based on this framework, the kinematic motion equations can be expressed in accordance with Equations (1) and (2):

$$\dot{R} = v_t\cos(\Psi_L - \Theta) - v_u\cos(\Psi_u - \Theta) \quad (1)$$

$$\dot{\Theta} = \frac{v_t\sin(\Psi_L - \Theta) - v_u\sin(\Psi_u - \Theta)}{R} \quad (2)$$

wherein $\dot{R}$ is the rate of change of the range (R) as the UAV 502 approaches the landing target 504, and $\dot{\theta}$ is the rate of change of the line of sight (LOS) angle between the UAV 502 and the target 504. The classical PPN guidance law can then be expressed in accordance with Equations (3) and (4):

$$a_u = Nv_u\dot{\Theta} \quad (3)$$

$$\Psi_u = \frac{a_u}{v_u} \quad (4)$$

wherein $a_u$ is the command acceleration of the UAV 502 approaching the landing target 504, and N is a proportional constant. The command acceleration then requires a single integration to generate a velocity command for the UAV, and a double integration to generate a position command. The position and velocity commands may then be fed into the position controller 400b in FIG. 4.

Although this classic definition has been applied to a variety of applications, it is not ideally suited for autonomous UAV landing missions. The classical PPN law assumes that the UAV is traveling at a constant velocity throughout the mission, including at point of impact. The change of acceleration is generated by changes to the line of sight (LOS) angle between the UAV 502 and the target 504, which allow the UAV 502 to be maneuvered to the target landing position 504. However, to avoid crash landings, the velocity of the UAV should be controlled and reduced as the UAV 502 approaches target 504. Accordingly, an additional guidance law is required to drive the velocity to zero as the UAV approaches target, so as to effect a gentle touchdown.

Figure 5B:
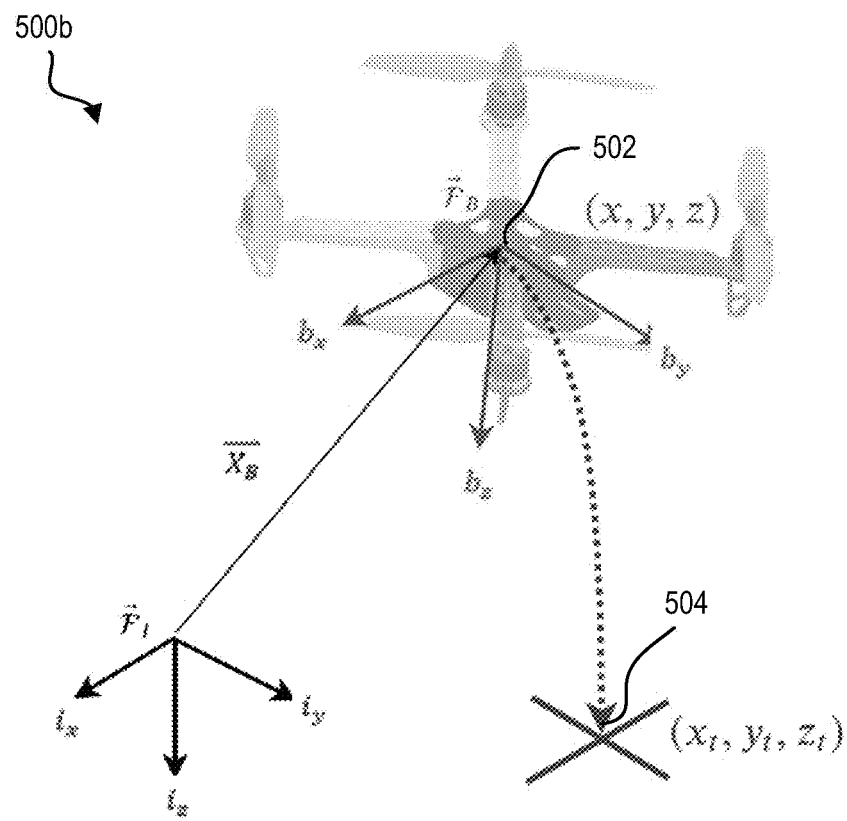
FIG. 5B is a schematic representation showing a modified PPN guidance law definition adapted for quadrotor UAVs.

Referring now to FIG. 5B, there is shown a schematic illustration of a modified PPN guidance law definition 500b.

The modified PPN guidance law definition 500b is based on the classic PPN law 500a of FIG. 5A. In particular, the modified PPN guidance law 500b assumes a static landing position and a UAV velocity of zero when the final target landing position is reached. In contrast to the classical approach, rather than using an acceleration command ($a_u$) and a constant UAV velocity, the modified PPN law uses a variable velocity command. This, in turn, lowers the dimension of the PPN problem in time by one by allowing position commands to be generated by a single integration from the velocity command (i.e., rather than a double integration from an acceleration command). The output of the PPN guidance law (e.g., position and velocity commands) are fed into the autopilot system 302 to control the UAV landing.

As shown in FIG. 5B, in the modified PPN guidance law, the target position 504 is defined by co-ordinates ($x_t$, $y_t$, $z_t$), and the position of the UAV 502 relative to the target is defined by co-ordinates (x, y, z), whereby "z" defines the vertical height altitude of the UAV 502. In various cases, the UAV position may be determined using data from an on-board GPS module, or a barometer equipped to the UAV. Similarly, the co-ordinates of the target position may be identified, for example, by GPS co-ordinates received from the flight management system 202 and/or stored on the autopilot 302 (e.g., memory 302b of autopilot 302).

In FIG. 5B, $\vec{F_B}$ expresses the UAV "Body-Fixed" reference frame whose origin is located at the center of mass of the quadrotor. In particular, the Body-Fixed reference frame ($\vec{F_B}$) rotates with the quadrotor UAV and is represented by $\vec{F_B} = (b_x, b_y, b_z)^T$. $\vec{F_I}$ expresses the inertial reference frame denoted by $\vec{F_I} = (i_x, i_y, i_z)^T$, and $\vec{X_B}$ is the quadrotor's position in the inertial frame ($\vec{F_I}$).

As stated previously, the modified PPN guidance law assumes that as the UAV 502 approaches target landing location 504, the incremental command velocity for the UAV approaches zero, as expressed in Equation (5):

$$(x,y,z) \rightarrow (x_t, y_t, z_t); \text{ Then } (\dot{x}, \dot{y}, \dot{z})_{cmd} \rightarrow 0 \quad (5)$$

wherein $\dot{x}$, $\dot{y}$, $\dot{z}$ define the velocity of the UAV 502 in the x, y and z co-ordinate axes, respectively, and $(\dot{x}, \dot{y}, \dot{z})_{cmd}$ is the incremental command velocity, generated for a time increment ($\Delta t$), for incrementally controlling the UAV velocity in each axes during the landing maneuver. As explained herein, the command velocities can be converted into position commands, which can be fed along with the velocity commands into a position controller implemented on the autopilot system 302 in order to control landing of the UAV (e.g., act 400a in FIG. 4).

The incremental command velocities for the UAV along each axis, in a time increment ($\Delta t$), can be further expressed in accordance with Equations (6)-(8):

$$\dot{x}_{cmd} = k_x(x_t - x) \quad (6)$$

$$\dot{y}_{cmd} = k_y(y_t - y) \quad (7)$$

$$\dot{z}_{cmd} = k_z(z_t - z) \quad (8)$$

wherein $k_x$, $k_y$, $k_z$ are pre-selected gain variables. In some cases, the gain variables in the x and y axis can be the same. If low gain values are selected for $k_x$, $k_y$, $k_z$, the command velocities remain low enough to where the position controller is able to adequately track the desired trajectory smoothly and accurately.

The incremental position commands, along each axis, can be determined using the integral of the incremental velocity commands, as expressed in Equation (9)-(11):

$$x_{cmd} = \int \dot{x}_{cmd} \cdot dt \quad (9)$$

$$z_{cmd} = \int \dot{y}_{cmd} \cdot dt \quad (10)$$

$$z_{cmd} = \int \dot{z}_{cmd} \cdot dt \quad (11)$$

To allow for generic code-based implementation on the autopilot 302, the position command is implemented in a discrete time domain, rather than the continuous time domain. Accordingly, in discrete time using a first-order Euler integration, the position commands in Equations (9)-(11) can be re-expressed according to Equation (12)-(14):

$$x_{cmd,t} = x_{cmd,t-1} + \dot{x}_{cmd}\Delta t \quad (12)$$

$$y_{cmd,t} = y_{cmd,t-1} + \dot{y}_{cmd}\Delta t \quad (13)$$

$$z_{cmd,t} = z_{cmd,t-1} + \dot{z}_{cmd}\Delta t \quad (14)$$

wherein $x_{cmd,t-1}$, $y_{cmd,t-1}$ and $z_{cmd,t-1}$ are position commands generated in a previous time-increment ($\Delta t$).

The velocity and position commands generated by the modified PPN guidance law may then be provided to a position controller operating on the autopilot system 302.

Figure 5C:
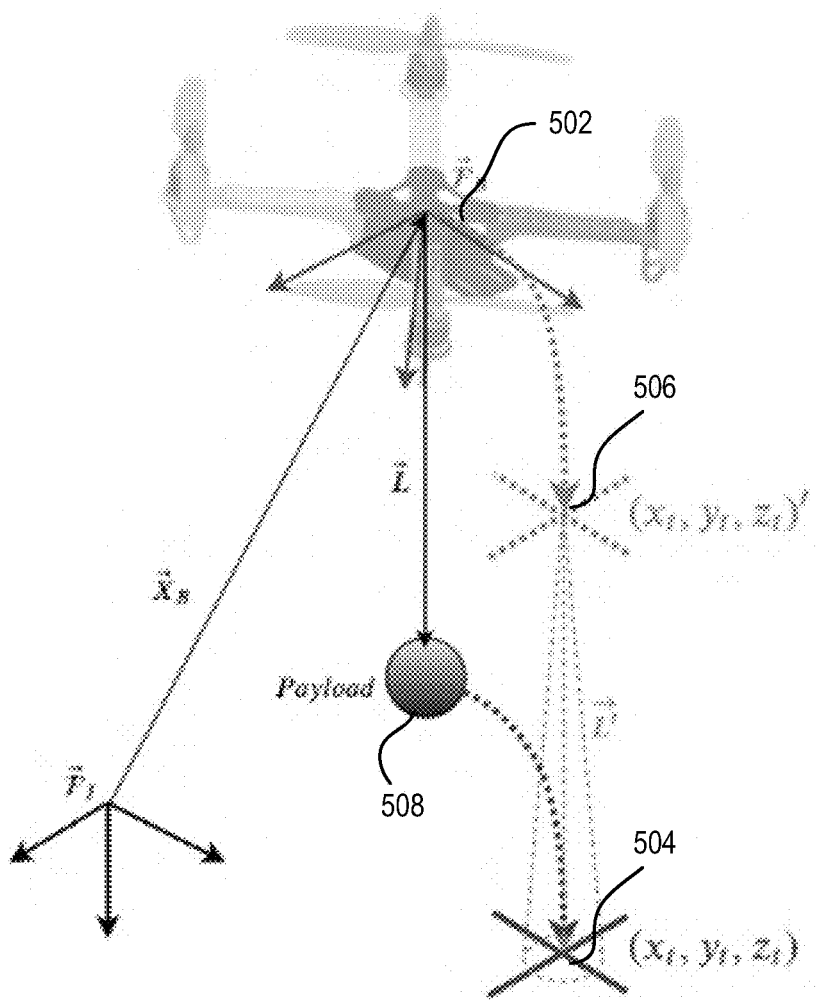
FIG. 5C is a schematic representation showing a modified PPN guidance law definition adapted for quadrotor UAVs carrying cable slung payloads.

Referring now to FIG. 5C, there is shown a schematic illustration of a modified PPN guidance law definition 500c which accounts for a cable-slung payload attached to the UAV.

In particular, while the modified PPN guidance law in FIG. 5B allows for determining command positions for autonomous UAV landing, the guidance law 500b does not otherwise account for an example application where a cable-slung payload requires landing on ground at a given target location. In view of the foregoing, there is a desire for a further modified PPN guidance law which can be used to drive a payload position to a target location. Further, as the cable-slung payload's position relative to the UAV, at each instance in time, may not be known (e.g., the payload is not sensor equipped), it is desirable that the further modified PPN guidance law be able to drive the payload position to the target location when the payload state information is not directly available to the autopilot 302.

As shown in FIG. 5C, the modified PPN guidance law definition 500c operates by driving the UAV 502 to a virtual target position 506 $(x_t, y_t, z_t)'$. The virtual target point is a desired location for the UAV 502 in which the cable-slung payload 508 is also positioned at its desired target landing location 504 $(x_t, y_t, z_t)$. The variable L represents the scalar value of the tether length for the tether (e.g., cable) that connects the UAV 502 to the payload 508. In this model, it is not assumed (or necessary) for the tether to be attached to the vehicle' center of mass, as may be the case with other models. While the position of the payload 508 relative to the UAV 502 at each instance in time may not be directly available (e.g., due to the swinging effect), the position of the UAV 502 is determined from one or more sensors equipped to the UAV (e.g., a GPS module or a barometer).

In order for the payload 508 to reach its target landing destination, the UAV 502 should be commanded to reach the virtual target point $(x_t, y_t, z_t)'$ positioned directly above the payload target location 504 $(x_t, y_t, z_t)$. The virtual target position 506 may be accordingly expressed in accordance with Equations (15)-(17):

$$x'_t = x_t \qquad (15)$$

$$y'_t = y_t \qquad (16)$$

$$z'_t = z_t + L \qquad (17)$$

The velocity commands in Equations (6)-(8) may be re-expressed in accordance with Equations (20)-(22) to reflect the virtual target destination point $(x_t, y_t, z_t)'$ for the UAV:

$$\dot{x}_{cmd} = k_x(x'_t - x) \qquad (20)$$

$$\dot{y}_{cmd} = k_y(y'_t - y) \qquad (21)$$

$$\dot{z}_{cmd} = k_z(z'_t - z) \qquad (22)$$

The discrete position commands in Equations (12)-(14) may then be determined by integrating the revised velocity commands in Equations (20)-(22).

Equations (15)-(17), however, assume that the payload 508 has no swinging motion. Although there are two single angles (along the X and Y axes), the variable (θ) can be used to represent the magnitude of the swing angle in relation to the "Z"-axis (i.e., with components along the X and Y axes). Using simple trigonometric functions, the relations for the positional offset in the Z and X-Y positions caused by a given swing angle can be obtained in accordance with Equations (23) and (24):

$$\Delta z = L - L \cos(\theta) \qquad (23)$$

$$\Delta xy = L \sin(\theta) \qquad (24)$$

wherein Δz represents the error between the desired and target co-ordinate 'Z' position for the payload 508, and Δxy represents the error in the X-Y plane. Table 1, below, demonstrates the effect of swing angle on payload position accuracy, in accordance with Equations (23) and (24):

TABLE 1

Swing Angle Effect on Payload Position Accuracy

| θ [°] | Δz [% of L] | Δxy [% of L] |
|---|---|---|
| 5 | 0.381 | 8.72 |
| 10 | 1.52 | 17.3 |
| 15 | 3.41 | 25.8 |

As shown in Table 1, the X-Y position accuracy is affected most by the swing angle. As well, for small swing angles, the X-Y position accuracy is high. For example, if the tether length is 1 meter, the error in the Z-position is less than 5 cm. Accordingly, it can be determined that for small swing angles, landing of the payload is relatively unaffected with small inaccuracy in the X-Y landing position. Therefore, during the landing phase, it is desirable to maintain a small swing angle to preserve landing accuracy. In various cases, Equations (23)-(24) can be incorporated into a position controller 400b to limit the extent of motion of the UAV which would result in large swing angles in the payload.

While embodiments herein describe the velocity commands as being linear functions of the determined distance between the current position of the UAV and a target landing position (or a virtual landing position), as expressed in Equations (6)-(8) and (20)-(22), it will be appreciated that, in other embodiments, the velocity command may be generated using any appropriate function, insofar as the condition expressed in Equation (5) is met (i.e., Equation (5) expresses the modified PPN guidance law principle). In other words, as the UAV approaches the target landing position (or virtual landing position), the incremental command velocity for the UAV should be made to approach zero, irrespective of how the incremental velocity command is determined.

Figure 6A:
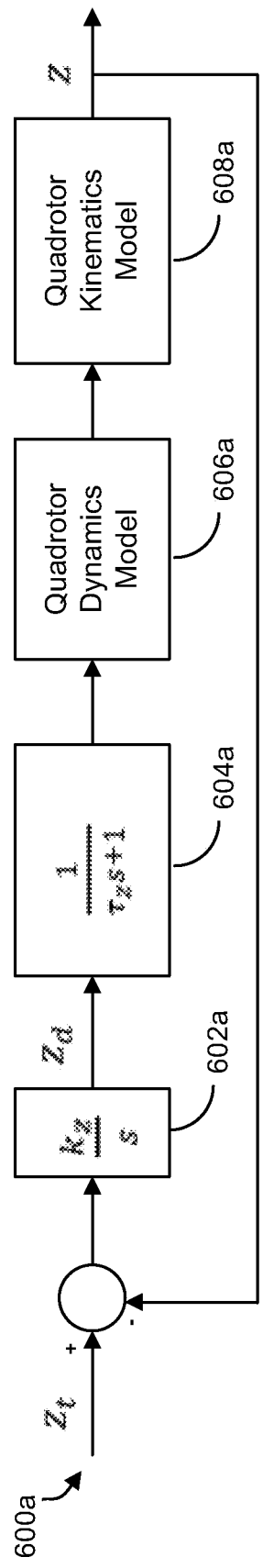
FIG. 6A is a block diagram for an example closed-loop system used for selecting a gain value for a "Z" co-ordinate velocity command generated by a modified PPN guidance law.
Figure 6B:
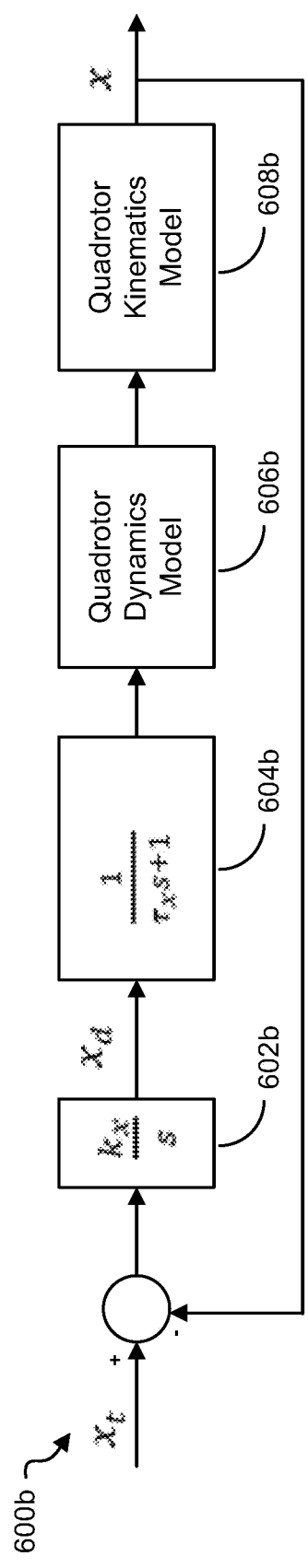
FIG. 6B is a block diagram for an example closed-loop system used for selecting a gain value for an "X" co-ordinate velocity command generated by a modified PPN guidance law.
Figure 6C:
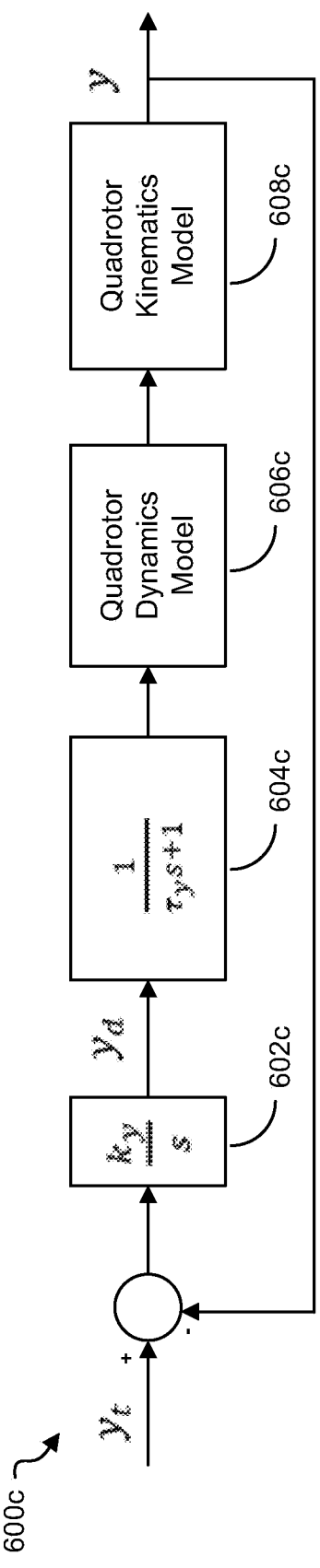
FIG. 6C is a block diagram for an example closed-loop system used for selecting a gain value for a "Y" co-ordinate velocity command generated by a modified PPN guidance law.

FIGS. 6A-6C show simplified block diagrams for closed-loop systems which can be used for selecting appropriate gain values $(k_x, k_z, k_y)$ in Equations (20)-(22). The closed-loop systems in FIGS. 6A-6C model (e.g., approximate) the behavior of the entire feedback-loop exemplified in FIG. 4. In particular, to model the behavior of the feedback loop in FIG. 4, the UAV system is provided with a step-input position (e.g., a desired position for the UAV), and the corresponding position response of the UAV was logged (e.g., the output of the kinematic module 414).

In FIG. 6, separate closed-loops systems are provided to model the behavior of the feedback loop in FIG. 4 with respect to the X co-ordinate position (FIG. 6B), Y co-ordinate position (FIG. 6C) and Z co-ordinate position (FIG. 6A) of the UAV.

The position response for the quadrotor UAV was approximated to either a first or second order system equation.

As shown in FIG. 6, each closed-loop system includes a gain block 602, a low-pass filter block 604, a quadrotor dynamics model 606 (e.g., quadrotor dynamics model 412 of FIG. 4) and a quadrotor kinematics model 608 (i.e., quadrotor kinematics model 414 in FIG. 4). The gain blocks 602 and low-pass filter blocks 604, provide a linearized model of the behavior of the PPN guidance law 400a and position controller 400b.

In each case, the gain block 602 is generally expressed according to the Laplacian transfer function shown in Equation (25):

$$\frac{k}{s} \qquad (25)$$

wherein k represents the gain parameter.

Further, the low-pass filter is generally expressed according to the Laplacian transfer function shown in Equation (26):

$$\frac{1}{\tau s + 1} \qquad (26)$$

wherein τ represents a time-constant.

The combination of Equation (25) and (26), in closed-loop form, result in a second-order transfer function, expressed in Equation (27), which provides the linearized model of the behavior of the PPN guidance law 400a and the position control 400b:

$$\frac{k}{\tau s^2 + s + k} \qquad (27)$$

The appropriate gain (k) and time-constant (τ) values, which achieve a stabilized system, in each of the closed-loop systems in FIGS. 6A-6C is determined through simulation and further fine-tuned through experimentation.

FIG. 6A shows a simplified block diagram 600a for an example closed-loop system for selecting a gain value ($k_z$) for the Z-axis velocity command (e.g., Equation (22)). Equation (28) shows an example of the closed-loop system transfer function obtained for an experimental quadrotor:

$$\frac{Z(s)}{Z_t(s)} = \frac{k_z}{s(0.65s + 1) + k_z} = \frac{k_z}{0.65s^2 + s + k_z} \qquad (28)$$

Accordingly, with reference to Equation (27), in this example case, the value of the time constant ($\tau_z$) in Equation (28) was determined to be 0.65. In order to resolve the gain value ($k_z$), the characteristic equation for the closed-loop system in Equation (28) is re-expressed according to the second-order equation in Equation (29):

$$0.65s^2 + s + k_z = 0 \qquad (29)$$

The stability of the system in Equation (29) is then analyzed using a Routh stability criterion to determine the appropriate gain value ($k_z$). The array of coefficients for the Routh stability criterion is constructed in Table 2:

TABLE 2

Array of Coefficients for Routh Stability Criterion ($k_z$)

| | | |
|---|---|---|
| $s^2$ | 0.65 | $k_z$ |
| $s^1$ | 1 | 0 |
| $s^0$ | $k_z$ | |

Accordingly, Table 2 indicates that the margin of stability for the system must be such that $k_z > 0$. In other words, any positive gain value may result in a stable system. However, this alone does not provide sufficient indication as to the performance of the system. As the closed loop system is second order, the system is compared against a characteristic, or standardized second order system equation, as expressed in Equation (30):

$$s^2 + 2\zeta\omega_n + \omega_n^2 = 0 \qquad (30)$$

wherein ζ is the damping ratio and $\omega_n$ is the system's natural frequency.

In order to minimize overshoot in the Z-axis, which would imply ground contact, it is desirable to have the system be critically damped (e.g., ζ=1). Based on this assumption, a gain value of $k_z = 0.385$ is determined. Accordingly, for landing, it is desirable to keep the gain between the bounds of $0.385 > k_z > 0$.

FIG. 6B shows a simplified block diagram 600b for an example closed-loop system for selecting a gain value ($k_x$) for the X-axis velocity command (e.g., Equation (20)). Equation (31) shows a closed-loop system transfer function obtained for an example quadrotor:

$$\frac{X(s)}{X_t(s)} = \frac{k_x}{s(0.95s + 1) + k_x} = \frac{k_z}{0.95s^2 + s + k_z} \qquad (31)$$

Accordingly, the value of the time constant (Tx) was determined to be 0.95. The characteristic equation for the closed-loop system in Equation (31) is re-expressed according to the second-order equation in Equation (32):

$$0.95s^2 + s + k_x = 0 \qquad (32)$$

The stability of the system in Equation (32) is analyzed using a Routh stability criterion to determine an appropriate gain value ($k_x$). The array of coefficients for the Routh stability criterion is constructed in Table 3:

TABLE 3

Array of Coefficients for Routh Stability Criterion ($k_x$)

| | | |
|---|---|---|
| $s^2$ | 0.95 | $k_x$ |
| $s^1$ | 1 | 0 |
| s0 | $k_x$ | |

Similar to Table 2, Table 3 indicates a stability margin where the gain must be greater than zero (i.e., $k_x > 0$). With reference to Equation (30), if no overshoot is desired, a gain can be chosen in a range between $0.263 > k_x > 0$. In contrast to the Z axis, where overshoot would result in collision with ground, in the X and Y axis, some overshoot may be acceptable. Accordingly, the gain value may be selected to be slightly larger than $k_x = 0.263$.

FIG. 6C shows a simplified block diagram 600c for a closed-loop system for selecting a gain value ($k_y$) for the Y-axis velocity command (e.g., Equation (21)). In various cases, the closed-loop transfer function in the Y-direction may be similar to Equation (31) in respect of the X-axis. Accordingly, the gain can also be chosen in a range between $0.263 > k_y > 0$, or in some cases, the gain value can be slightly larger than $k_y = 0.263$.

Referring now to FIGS. 7-8, there are shown example plots generated by simulating a landing maneuver using an example simulated quadrotor UAV having a cable-slung payload.

The simulated landing maneuvers, in FIGS. 7-8, were carried out using a Gazebo Simulator tool. The tether cable, used to carry the payload, was simulated as a single rigid link. Mass and inertial properties were added into the simulator to resemble properties of an experimental quadrotor UAV platform. The mass and inertial properties were generated by using a scale to measure the mass of individual components of the experimental UAV quadrotor, and measuring the approximate center of these components, from the center of the quadrotor. The principal moments of inertia around the X, Y and Z axes were then calculated using a generalized parallel axis theorem. Table 4, below, shows example values used for the moments of inertia to simulate the experimental UAV quadrotor platform.

TABLE 4

Moment of Inertia for UAV Quadrotor [kg · m²]

| | $I_{xx}$ | $I_{yy}$ | $I_{zz}$ |
|---|---|---|---|
| Motors | 0.006815 | 0.006815 | 0.007869 |
| Electronic Speed Controller (ESC) | 0.0006442 | 0.0006442 | 0.0001228 |
| Autopilot Hardware | 7.50E−6 | 2.21E−5 | 2.81E−5 |
| On-Board Computer | 0.0007157 | 0.0007555 | 0.0001033 |
| LiPO Battery | 0.0002905 | 0.0004193 | 0.0001544 |
| Quadrotor Frame Arms | 0.003038 | 0.003038 | 0.003308 |
| Total | 0.01151 | 0.01169 | 0.01275 |

Figure 7A:
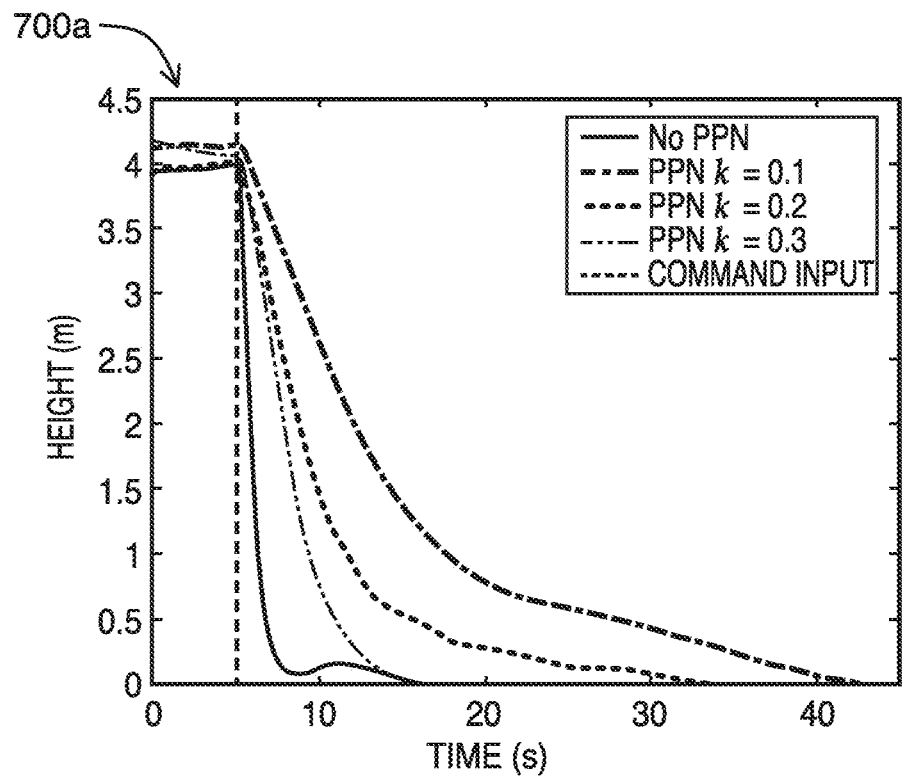
FIG. 7A is a plot showing the position trajectory of a simulated quadrotor UAV, along the "Z" co-ordinate axis, as a function of time, during a simulated vertical landing descent.

Referring now to FIG. 7A, there is shown a plot illustrating the position trajectory of the simulated quadrotor UAV, along the Z co-ordinate axis, as a function of time, during a simulated vertical landing descent. In the example simulation, the UAV is not simulated with a cable slung payload.

In a vertical landing descent, the UAV is assumed to be hovering initially directly above the desired landing target, prior to touching down. In this example simulation, the hover height is set at 4 meters above target. Plot 700a compares a case where the simulated position controller is not guided by a PPN guidance law, and a case where the position controller (e.g., a PID position controller) is guided by a modified PPN guidance law, as expressed in equations (5)-(14) for three different gain values (e.g., $k_z$=0.1, 0.2 and 0.3). Plot 700a also illustrates the "command step input", which directs the UAV to vertically land.

As shown, while each simulation drives the UAV quadrotor to land, the step input for the unguided controller results in a profile where the quadrotor drops from the sky and crash-lands. Further, for the unguided controller, the UAV re-curves around the 10 second mark, and shows a small oscillation before eventually completing landing. On the other hand, for the PPN guided controllers, the landing maneuver is more docile and smooth. Accordingly, plot 700a demonstrates the improved performance of the modified PPN guided position controller, at least for a simulated vertical descent landing.

Figure 7B:
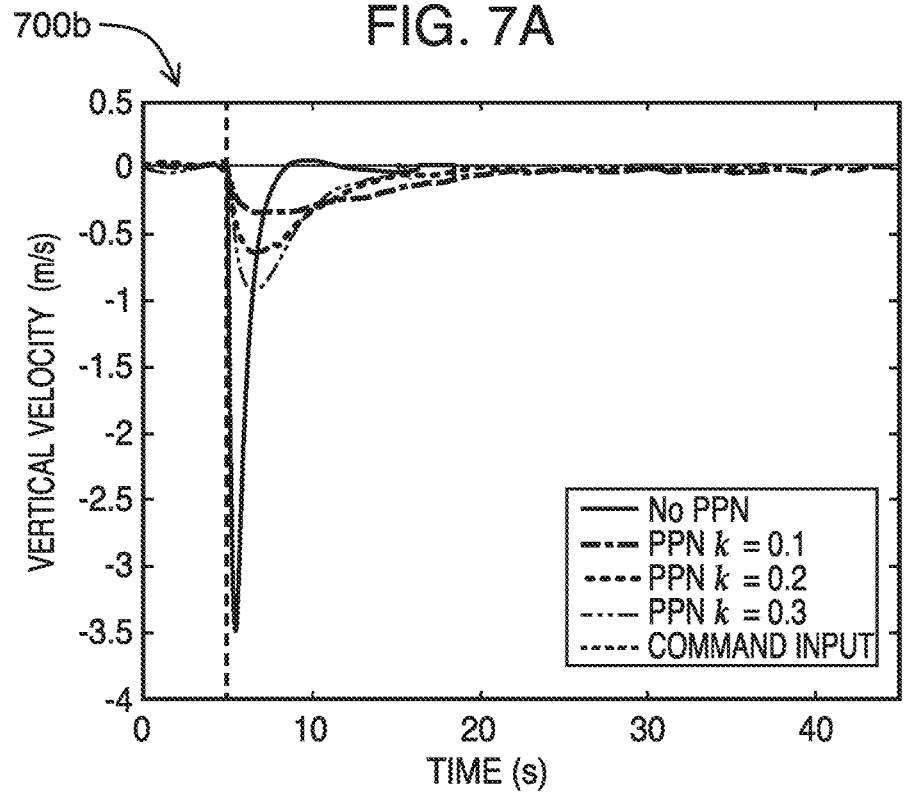
FIG. 7B is a plot showing the velocity trajectory for the simulated quadrotor UAV, along the "Z" co-ordinate axis, as a function of time, during the simulated vertical landing descent of FIG. 7A.

Referring now to FIG. 7B, there is shown a plot illustrating the velocity trajectory for the simulated quadrotor UAV, along the Z co-ordinate axis, as a function of time, during the simulated vertical landing descent of FIG. 7A.

As shown, the step-input for the unguided position controller again results in a sharp velocity profile (e.g., high acceleration), which is not otherwise observed when using the PPN guided position controller. In particular, using the modified PPN laws, the velocity profile is more controlled, and the maximum velocity is maintained at less than one-third of that of the unguided controller. Further, at a gain of $k_z$=0.3, the quadrotor is brought to rest on the ground quicker than the unguided controller, despite the lower acceleration and velocity. Accordingly, choosing a gain between $k_z$=0.2-0.3 provides enhanced results for the landing maneuver.

Referring now to FIGS. 8A-8F, which show plots for a simulated translational descent maneuver for an example simulated UAV quadrotor that is not carrying a payload.

In contrast to a vertical descent, a translational descent represents a case where the landing maneuver is initiated once the UAV quadrotor is within the vicinity of the landing target, rather than being located directly over the landing target. For example, this may occur where the UAV is not required to descend vertically over the final target location (e.g., landing in an open field). Generally, translational landing maneuvers save time during a transport mission, as the UAV may follow a shorter path to reach the final landing target. In the example simulations plotted in FIGS. 8A-8F, the simulated quadrotor UAV is set to an initial position of (x, y, z)=(4,4,4) m, and the target location is set at a pre-defined origin position on ground at (x, y, z)=(0,0,0) m.

Figures 8A, 8B, 8C:
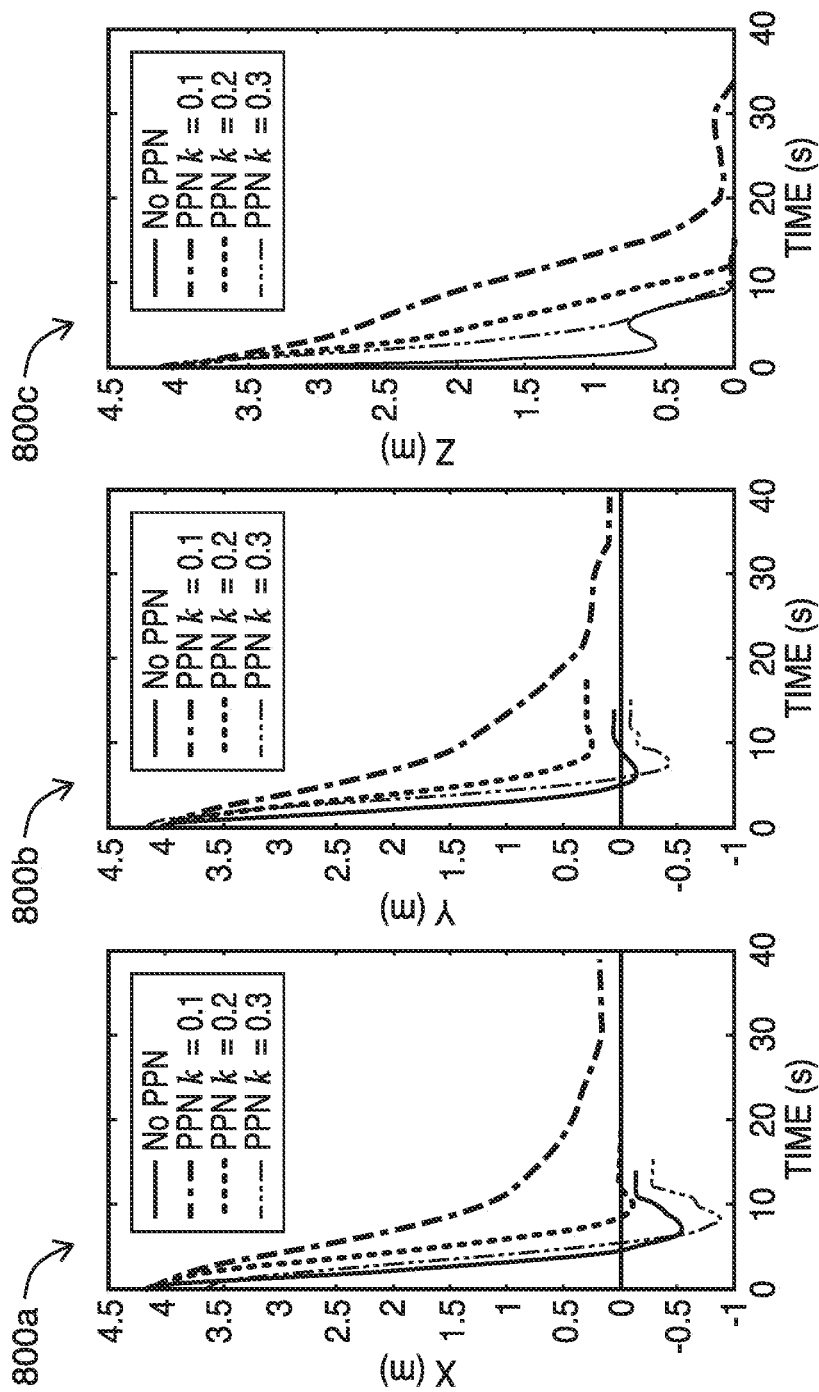
FIG. 8A is a plot showing the "X" co-ordinate position of a simulated quadrotor UAV, during a translational descent, as a function of time.
FIG. 8B is a plot showing the "Y" co-ordinate position of a simulated quadrotor UAV, during the translational descent, as a function of time.
FIG. 8C is a plot showing the "Z" co-ordinate position of a simulated quadrotor UAV, during the translational descent, as a function of time.

FIG. 8A shows a plot 800a which illustrates the "X" co-ordinate position of the simulated quadrotor UAV, during the translational descent, as a function of time. FIG. 8B shows a plot 800b for the "Y" co-ordinate position of the simulated quadrotor UAV as a function of time. FIG. 8C shows a plot 800c for the "Z" co-ordinate position of the simulated quadrotor UAV as a function of time. In each case, the results are compared for an unguided position controller, as well as a modified PPN law guided position controller (e.g., a PID controller0 which uses three different gains (e.g., k=0.1, 0.2 and 0.3).

As shown, the unguided controller demonstrates fast reaction to the step-input command, but introduces some oscillation and overshoot in the "X" and "Y" axes. In each case, there is relatively small error in the "X" and "Y" position of the simulated quadrotor UAV, however, all cases arrive within close proximity to the desired target.

Referring now to FIGS. 8D-8F, which show example velocity plots for the simulated translational descents plotted in FIGS. 8A-8C.

FIG. 8D shows a plot 800d illustrating the velocity trajectory for the simulated quadrotor UAV, along the "X" co-ordinate axis, as a function of time. FIG. 8E is a plot 800e illustrating the velocity trajectory for the simulated quadrotor UAV, along the "Y" co-ordinate axis, as a function of time. FIG. 8F illustrating the velocity trajectory for the simulated quadrotor UAV, along the "Z" co-ordinate axis, as a function of time. In each case, the results are again compared using an unguided simulated position controller, as well as a modified PPN law guided simulated position controller for three different gain values (e.g., k=0.1, 0.2 and 0.3).

As shown, a large spike may be observed for the unguided controller velocity, which indicates an aggressive landing maneuver with high acceleration. In contrast, the PPN velocities are less than one-third of the unguided controller velocity, and provide a smooth landing trajectory that is ideal for UAVs carrying payloads. In particular, the PPN guided PID controllers provide a smooth landing with a near identical landing time as the PID controller when the PPN law uses a gain of k=0.3. The noisy velocity behavior in each of the PPN guidance cases results from the vehicle contacting ground. In various cases, the noisy velocity behavior can be prevent by immediately disarming the quadrotor at landing (e.g., either manually or automatically through detection of the landing state).

Figure 8G:
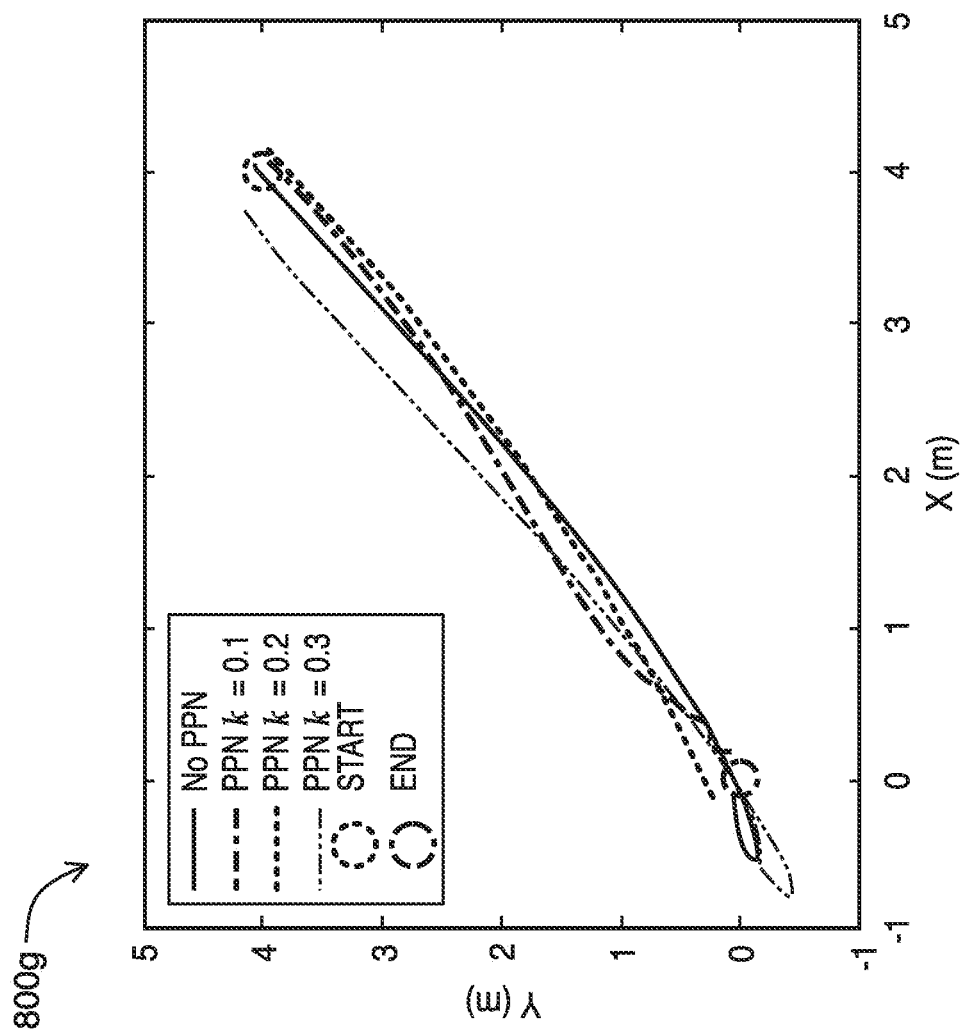
FIG. 8G is a plot showing the "X-Y" co-ordinate position of a simulated UAV quadrotor during various simulated translational landing descents.

FIG. 8G shows a plot 800g of the X-Y position trajectory of the simulated quadrotor UAV during the simulated translational descent using an unguided PID controller, and a guided PID controller having variable gains (e.g., k=0.1, 0.2 and 0.3). As shown, each simulation in plot 800g follows a nearly straight line path in the X-Y plane to reach the final target destination.

Figure 8I:
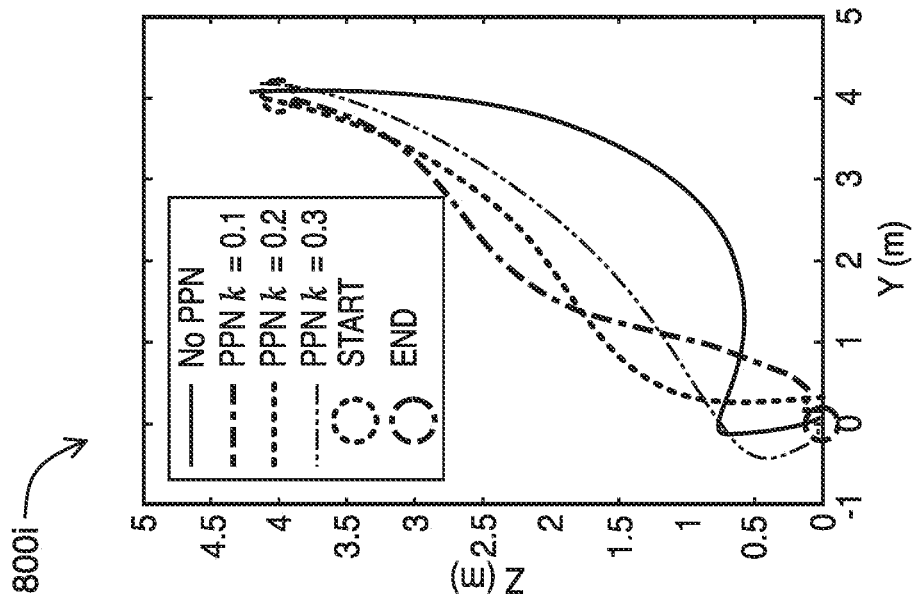
FIG. 8I is a plot showing the "Y-Z" co-ordinate position of a simulated UAV quadrotor during various simulated translational landing descents.
Figure 8H:
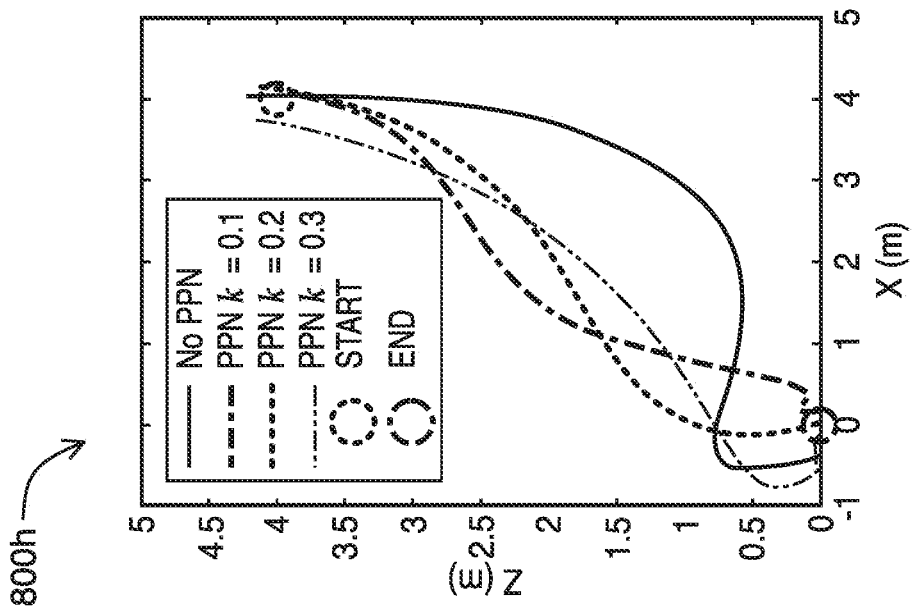
FIG. 8H is a plot showing the "X-Z" co-ordinate position of a simulated UAV quadrotor during various simulated translational landing descents.

FIG. 8H shows a plot 800h of the X-Z position trajectory of the simulated quadrotor UAV during the simulated translational descent. FIG. 8I shows a plot 800i of the Y-Z position trajectory of the simulated quadrotor UAV during the simulated translational descent. As shown, the PPN guidance using a gain of k=0.2 provides the smoothest trajectory, while the PPN using a gain of k=0.3 results in less overshoot of the x-y position.

Accordingly, and in view of the simulation results of FIGS. 7A-7B and 8A-8I, it can be observed that the PPN guidance law provides smoother landing and lower accelerations during the landing phase than the unguided position controller. Accordingly, the PPN guided controller is ideal for UAVs carrying sensitive payloads.

Referring now to FIGS. 9-12, which illustrates various plots generated during experimental landings of an example quadrotor UAV.

Figure 9A:
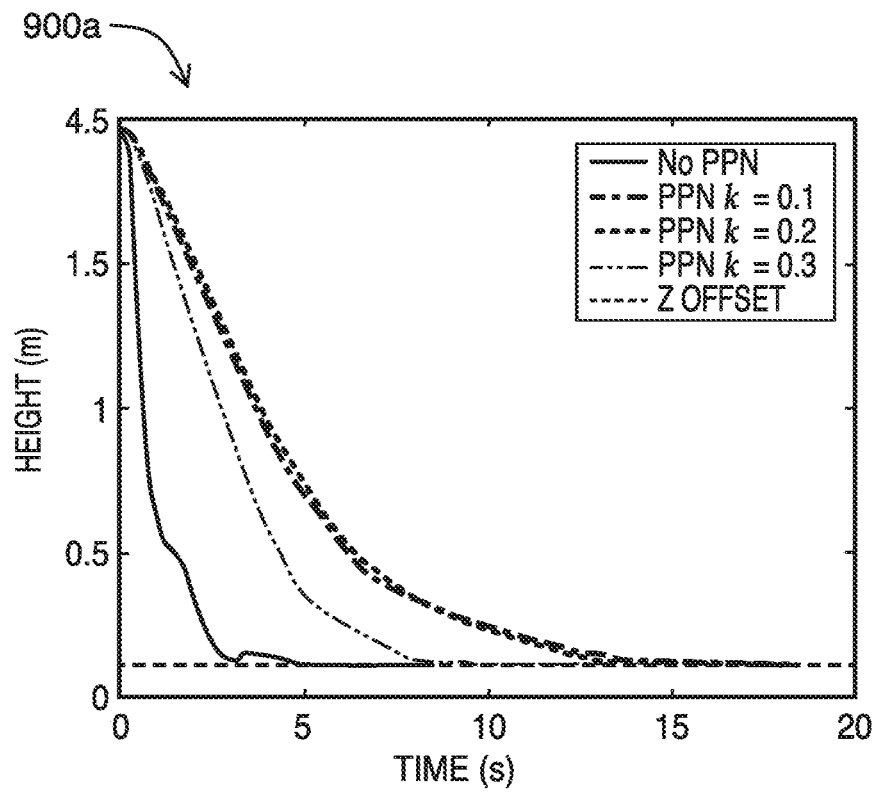
FIG. 9A is a plot showing the position trajectory of a quadrotor UAV, along the "Z" co-ordinate axis, as a function of time, during an experimental vertical landing descent.
Figure 9B:
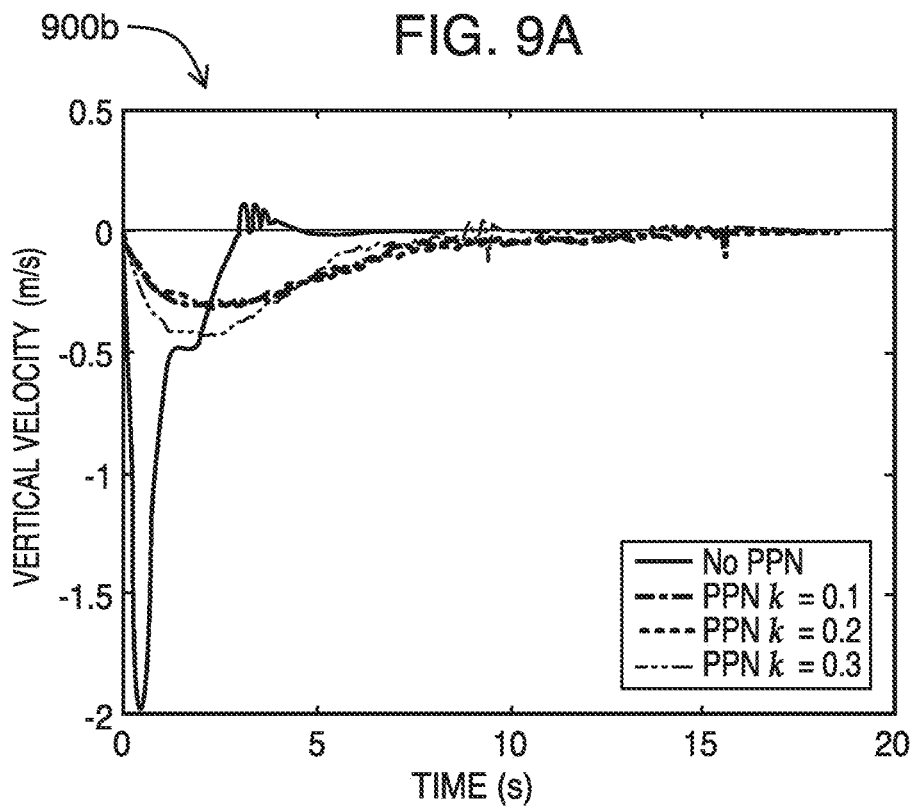
FIG. 9B is a plot showing the velocity trajectory for the quadrotor UAV, along the "Z" co-ordinate axis, as a function of time, during the experimental vertical landing descent of FIG. 9A.

Referring first to FIGS. 9A and 9B, which illustrate plots generated during an experimental vertical descent landing of a quadrotor UAV having no attached payload. The modified PPN guidance law developed in equations (5)-(14) is used to guide the position controller during the landing maneuver. The experimental vertical landing was performed from a vertical height of approximately 2 meters above ground.

FIG. 9A shows a plot 900a illustrating the position trajectory for the experimental quadrotor UAV, along the "Z" co-ordinate axis, as a function of time, during the experimental vertical landing. As shown, using the PPN guidance, the vehicle touches down with a small (e.g., near zero) vertical velocity, resulting in a smooth touchdown and no noticeable bounce. In contrast, without the guidance law, the landing is not as comparatively smooth. Accordingly, although the "unguided" controller reaches ground in the shortest period of time, it does not demonstrate smooth landing, which can be required for UAV's carrying payloads. Further, the "unguided" controller, it can be observed that there is an initial touchdown at around 3 seconds, which results in a re-bound off of ground due to the large vertical velocity on touchdown. Notably, the PID controller used in this experiment is turned for position holding accuracy. Accordingly, while it may be possible to tune the controller gains to achieve a softer landing, this may have an adverse effect on the controller's performance under a set-point holding task. Apart from using a gain-scheduled controller, it can be assumed that a single set of PID gains should be used for the flight. This is viewed as an advantage to using a guidance law, since the position controller can be used for accurately holding a desired position. When a smooth landing is desired, the guidance law can be activated to generate desired position inputs. The performance of the landing maneuver can then be independently tuned using the guidance law gain k.

FIG. 9B shows a plot illustrating the velocity trajectory for the quadrotor UAV, along the "Z" co-ordinate axis, as a function of time, during the experimental vertical landing descent of FIG. 9A.

As shown, the ground contact for the UAV quadrotor using an un-guided controller results in the same positive velocity with oscillations (e.g., rebounding response) as observed in FIG. 9A. In the case of PPN landings, the velocity approaches zero more gradually, and is generally lower than the unguided controller. Accordingly, this results in a smoother landing procedure, and a softer touchdown. Further, there are small positive oscillation in the velocity upon ground contact when the PPN has a gain value of $k_z$=0.3. However, the positive oscillations when the gain value is $k_z$=0.3 are smaller in magnitude than the unguided PID, and results in no noticeable rebound from the ground. Still further, the velocity profile of the PPN law remains smoother and lower than without guidance law, implying that the acceleration is lower during the landing maneuver. Accordingly, this results in a more docile landing compared to the unguided controller, which has a high velocity with a large initial acceleration (e.g., slope of the velocity).

In view of the foregoing, FIGS. 9A-9B demonstrate that the PPN with a gain of $k_z$=0.3 achieve a landing that is softest, with a smooth trajectory and is otherwise reasonably fast to reach the ground. In contrast, the unguided controller results in a landing which drops quickly, but overshoots the final target height, resulting in a collision with the ground and causing the vehicle to bounce. The PPN with a gain of $k_z$=0.1 and $k_z$=0.2 both result in smooth landing trajectories, however these PPNs take approximately double the time to settle as the PPN with a gain of $k_z$=0.3.

Referring now to FIGS. 10A-10I, which illustrate plots of results generated during an experimental translational descent landing of a quadrotor UAV having no attached payload. In the experimental translational landing, the UAV was configured to descend from an initial elevated position of (x, y, z)=(1,1,2) to a target position located at (x, y, z)=(-1,-1,0).

Figures 10A, 10B, 10C:
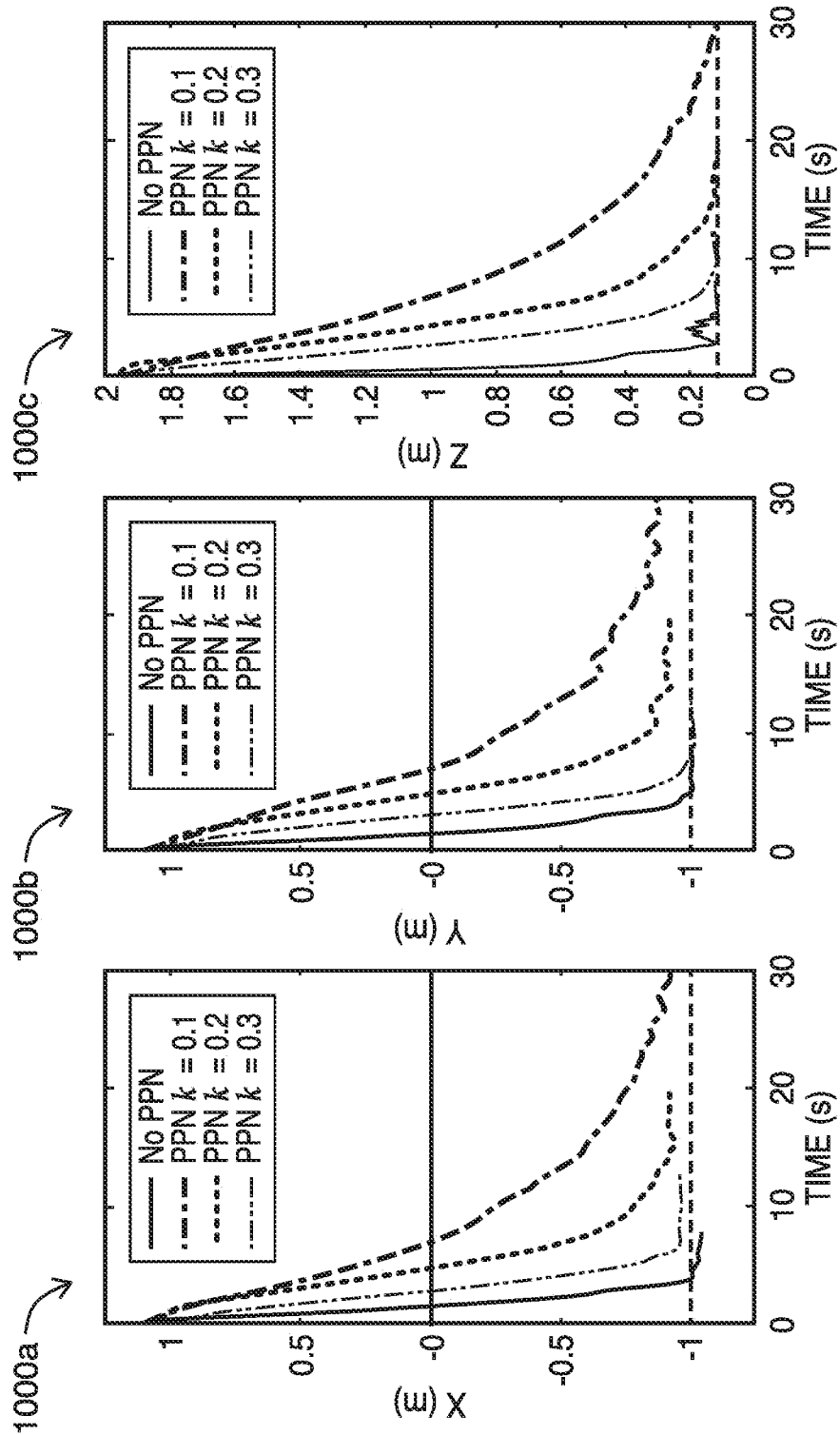
FIG. 10A is a plot showing the "X" co-ordinate position of an example quadrotor UAV, as a function of time, for various experimental translational landing descents.
FIG. 10B is a plot showing the "Y" co-ordinate position of an example quadrotor UAV, as a function of time, for various experimental translational landing descents.
FIG. 10C is a plot showing the "Z" co-ordinate position of an example quadrotor UAV, as a function of time, for various experimental translational landing descents.

FIGS. 10A-10C show plots of the position trajectory of the quadrotor UAV, as a function of time, during the experimental translational landing. Results are compared using an unguided position controller, and a position controller guided by the modified PPN law (e.g., Equations (5)-(14)) using three gain values (e.g., k=0.1, 0.2 and 0.3). In particular, FIG. 10A shows a plot 1000a of the "X" co-ordinate position of the UAV quadrotor as a function of time, FIG. 10B shows a plot 1000b of the "Y" co-ordinate position of the quadrotor UAV as a function of time and FIG. 10C shows a plot 1000c of the "Z" co-ordinate position of the quadrotor UAV as a function of time.

As shown in FIGS. 10A-10C, the unguided controller responds the fastest with the highest descending speed and acceleration, but results in a hard landing with ground. The hard touchdown using the unguided controller is best observed in plot 1000c, at approximately the five second mark. In contrast, while the PPN guided landings took longer to complete than the unguided landings, the resulting landing trajectories were smoother and the landing was more docile. Accordingly, these performance results are ideal for cases where the UAV may be carrying a payload. High performance results were particularly observed with the PPN using a gain of k=0.3, as it resulted in the highest landing accuracy and the lowest completion time of each of the three gains.

Figures 10D, 10E, 10F:
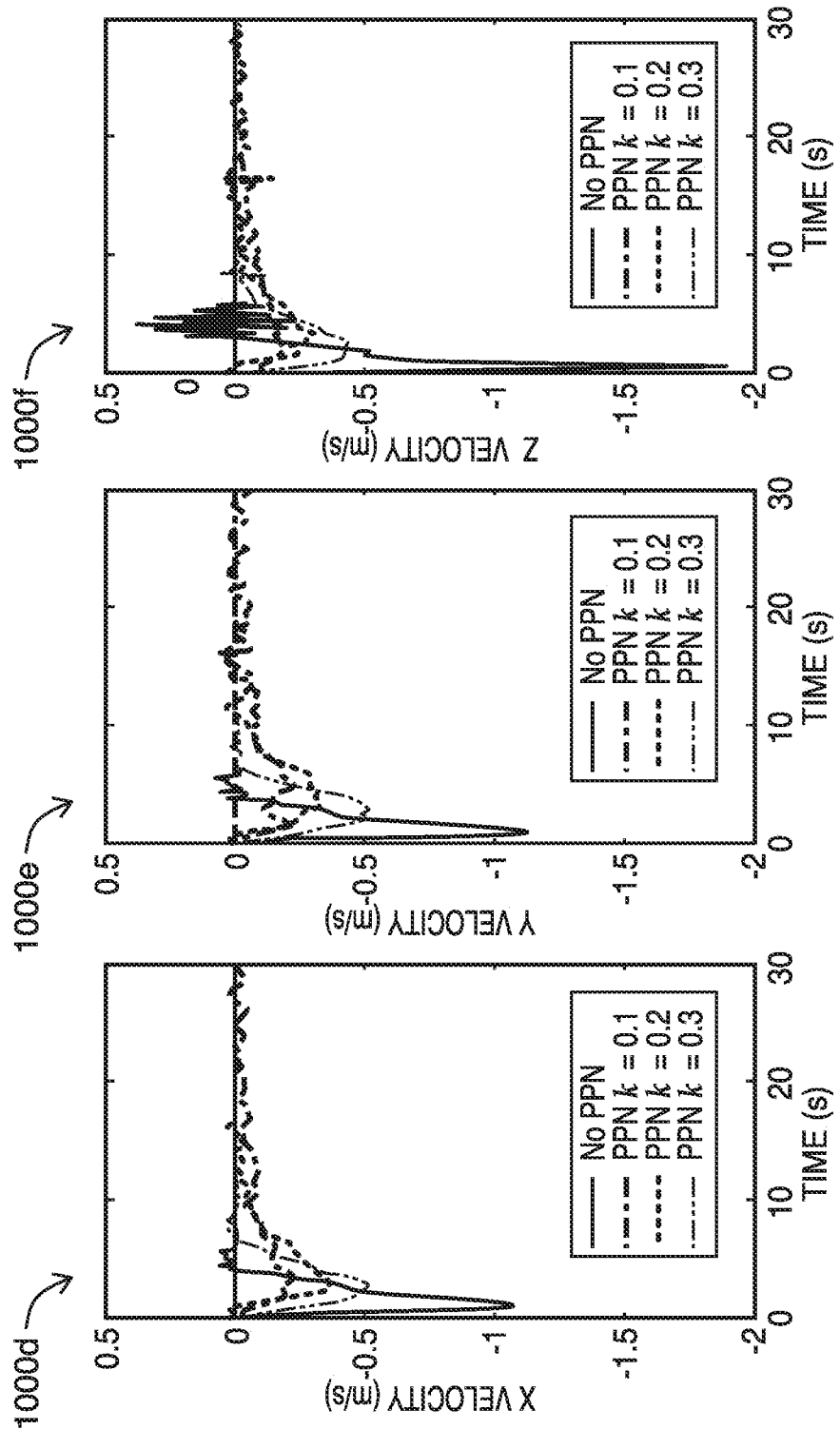
FIG. 10D is a plot showing the "X" axis velocity trajectory of an example quadrotor UAV, as a function of time, for various experimental translational landing descents.
FIG. 10E is a plot showing the "Y" axis velocity trajectory of an example quadrotor UAV, as a function of time, for various experimental translational landing descents.
FIG. 10F is a plot showing the "Z" axis velocity trajectory of an example quadrotor UAV, as a function of time, for various experimental translational landing descents.

FIG. 10D-10F, which show plots of the velocity trajectory of the quadrotor UAV during the experimental translational landing descent. In particular, FIG. 10D shows a plot 1000d of the "X" axis velocity trajectory for the quadrotor UAV as a function of time, FIG. 10E shows a plot 1000e of the "Y" axis velocity for the quadrotor UAV as a function of time and FIG. 10F shows a plot 1000f of the "Z" axis velocity for the quadrotor UAV as a function of time.

As shown in FIGS. 10D-10F, large oscillations are observed in the "Z" axis velocity after the UAV has rebounded from ground. Further, the PPN guided landings achieved desirable landings, as there was only a small single oscillation upon touchdown, which can be expected upon ground contact. The unguided controller had a rebound and oscillations upon strong ground contact which were also not observed in the PPN guided landings.

Figure 10G:
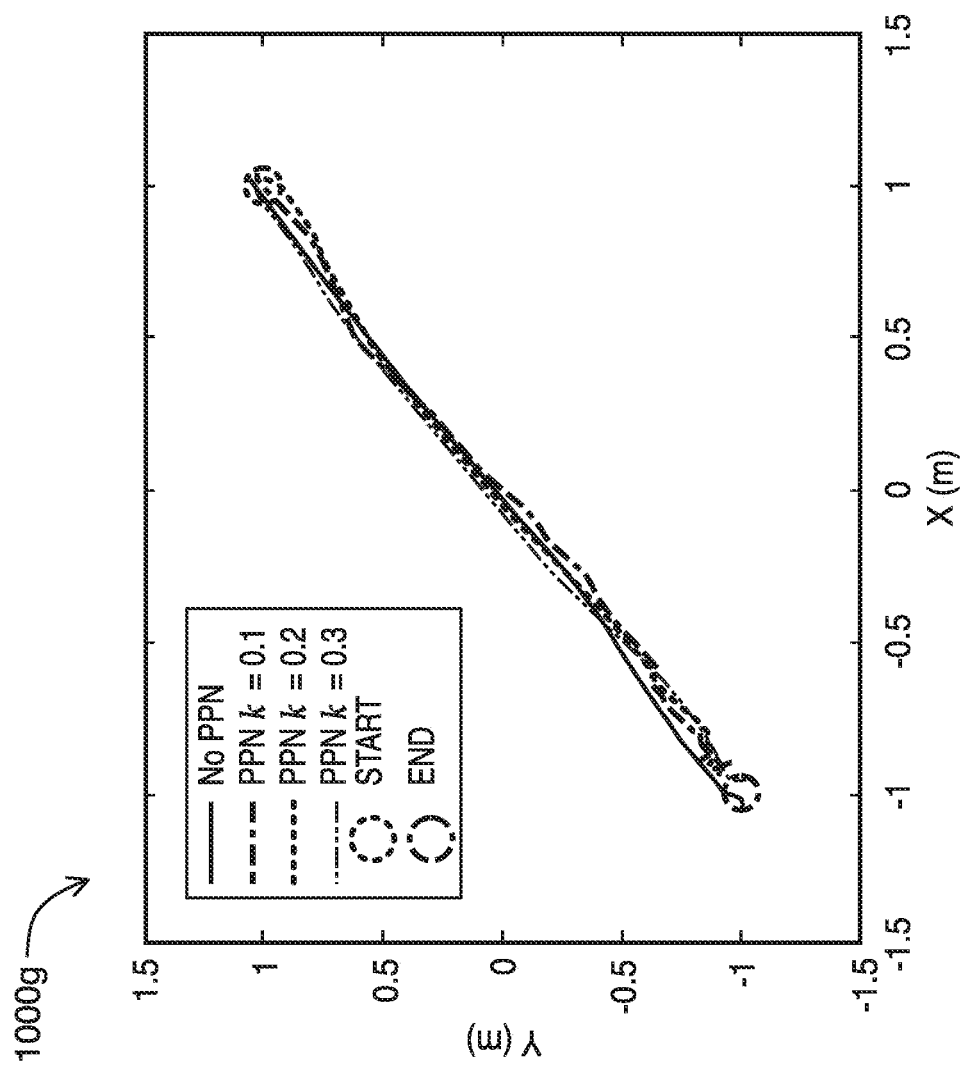
FIG. 10G is a plot showing the "X-Y" trajectory position of an example quadrotor UAV during an experimental translational landing descent.

FIG. 10G shows a plot 1000g of X-Y trajectory position of the quadrotor UAV during the experimental translational landing. As shown, for each of unguided and guided position controllers, the UAV followed a relatively straight line path between the start and end positions, with minimal tracking oscillation along the way.

Figure 10I:
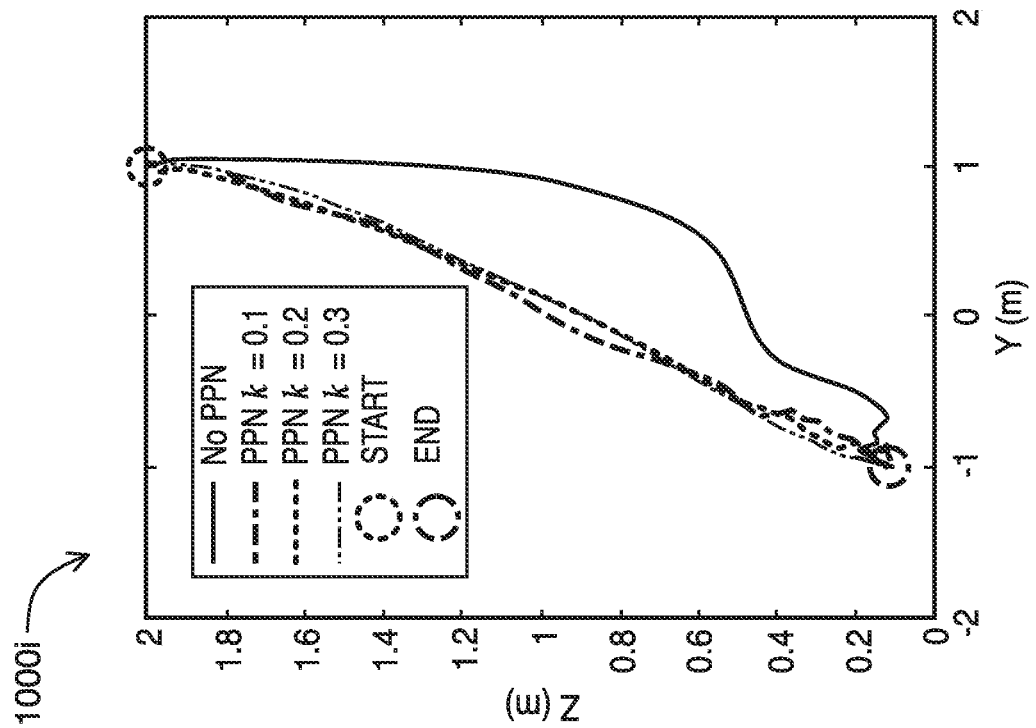
FIG. 10I is a plot showing the "Y-Z" trajectory position of an example quadrotor UAV during an experimental translational landing descent.
Figure 10H:
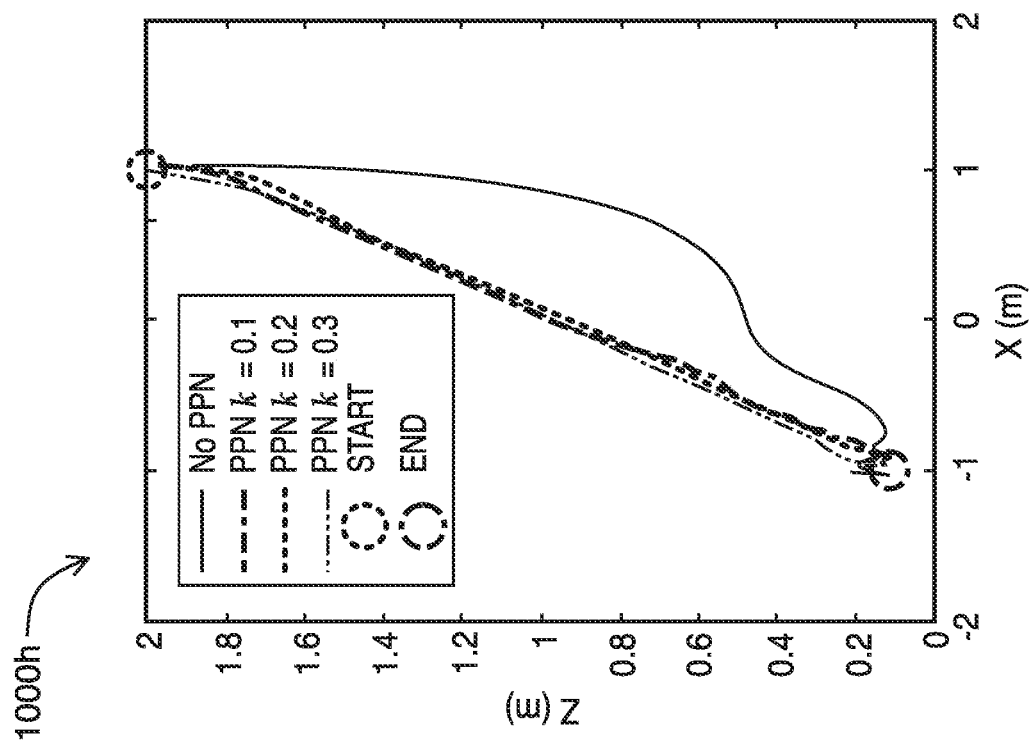
FIG. 10H is a plot showing the "X-Z" trajectory position of an example quadrotor UAV during an experimental translational landing descent.

FIG. 10H shows a plot 1000h of the X-Z trajectory position of the UAV during the translational landing maneuver. FIG. 10I shows a plot 1000i of the Y-Z trajectory position of the UAV during the translational landing maneuver.

As shown, in each of plots 1000h and 1000i, there are observable differences between the flight path using the unguided and PPN guided landings. In particular, the PPN guided landing follows a more direct path, near to a straight line between the start and end locations. In contrast, for the unguided case, the UAV "drops" from the air initially, which results in some oscillatory behavior throughout the flight. For the unguided case, there is a hard touchdown and rebound before the unguided controller reaches the target location. Further, there are observable differences with respect to the behavior in the approach angle to the final target. For example, the PPN guided UAV follows a path that is the shortest distance between the goal and the target, which is not observed in the unguided path. Accordingly, the unguided path may present problems in a practical application where there are tall objects on the ground (e.g., trees of building structures). In particular, by allowing the altitude to drop initially in the unguided case, the UAV is completing the rest of its translation maneuver at a lower altitude, where it is more likely to collide with an object.

Figure 11:
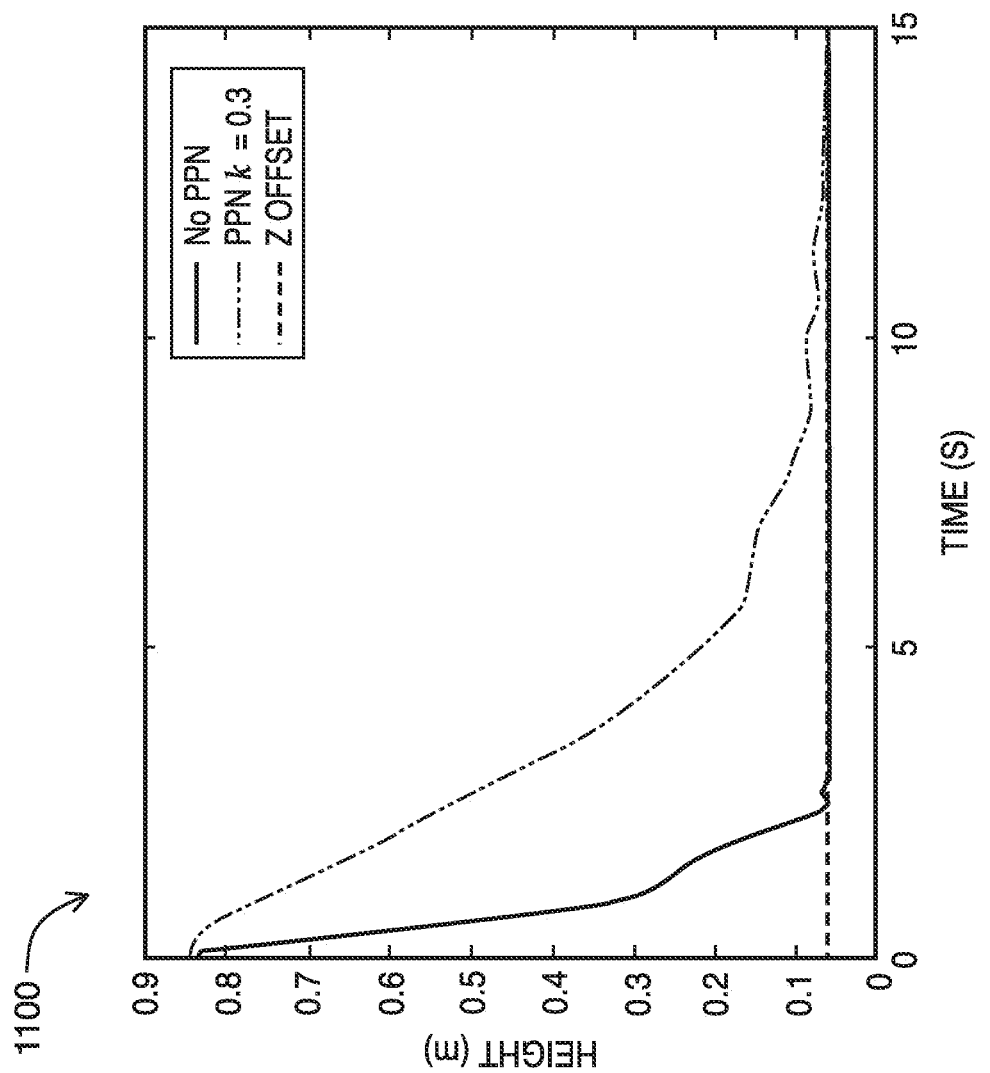
FIG. 11 is a plot showing the "Z" co-ordinate position of an example cable slung payload, as a function of time, during various experimental vertical landing descents.

Referring now to FIGS. 11-12, which illustrate plots of results generated during experimental landings of a quadrotor UAV having a cable-slung payload.

Referring first to FIG. 11, which shows a plot 1100 illustrating a "Z" co-ordinate position of a cable-slung payload, as a function of time, during an experimental vertical landing of a quadrotor UAV.

In particular, plot 1100 compares the "Z" co-ordinate position of the cable-slung payload using an unguided position controller in the quadrotor UAV, and a case where a PPN guided position controller is used having a gain of k=0.3. In this case, the UAV position controller is guided by the modified guidance law developed in Equations (20)-(22). Plot 1100 is generated using a payload having a mass of approximately 500 g and a tether length of approximately 1 meter. The payload mass is approximately half of the mass of the experimental UAV quadrotor, and is considered a heavy payload for the UAV. In particular, a heavy payload is more likely to cause the system to destabilize as any payload swing will have a greater effect the UAV motion due to the larger reaction forces generated through the tether. Plot 1100 also assumes an initial vertical height of the UAV of 2 meters above ground. Due to an offset in the centroids in the UAV and payload, a 1 meter tether length results in an offset between the UAV and the payload of approximately 1.15 meters. Accordingly, when the UAV is at 2 meters, the payload begins at a height of approximately 0.85 meters.

As shown in FIG. 11, the unguided controller reaches the final target faster than the PPN guided controller. The steep slope for the unguided landing indicates that the payload touches down with a higher velocity when compared to the PPN landing. In particular, this results in a small rebound in height resulting from ground contact. The magnitude of this rebound is small, however, due to the low initial altitude of the payload. While the PPN landing takes longer to reach final touchdown, the slope approaching this target is low, indicating a softer touchdown. Accordingly, this soft touchdown is well suited for sensitive payloads.

Referring now to FIGS. 12A-12I, which show various plots obtained during experimental translational landing descendent of a UAV quadrotor having a cable slung payload.

Similar to plot 1100 of FIG. 11, plots in FIGS. 12A-12I are generated for a quadrotor UAV having a tether length of 1 meter attached to a payload of approximately 500 g (e.g., roughly half the mass of the UAV quadrotor). The quadrotor begins from an initial co-ordinate position of (x, y, z)=(1, 1,2) meters, which results in the payload having an initial position of (x, y, z)=(1,1,0.85) meters. The UAV is provided a virtual landing target as the goal location for delivering the payload. In the example case of FIGS. 12A-12I, the virtual target location for the UAV is set at $(x_t, y_t, z_t)=(-1,-1,1)$ meters. Due to the length of the tether and height of the payload, an altitude of 1 meter in-fact positions the payload a few centimeters lower than what is required for touchdown. However, this positioning helps ensure that the payload is resting on the ground with minimal tension in the cable, allowing the cable to be released when the payload is at rest.

Figures 12A, 12B, 12C:
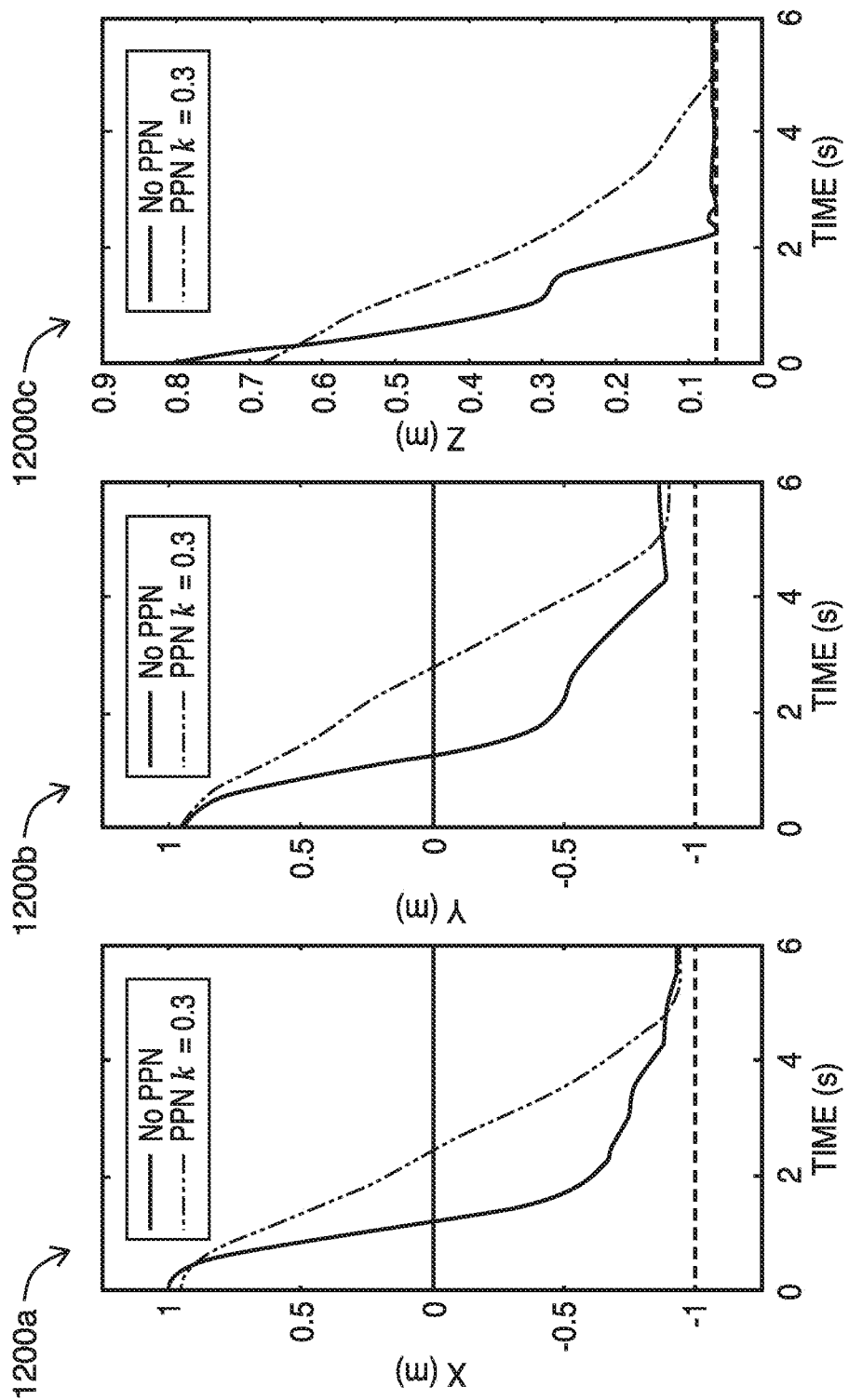
FIG. 12A is a plot showing the "X" co-ordinate position for a cable slung payload, as a function of time, during various experimental translational landing descents.
FIG. 12B is a plot showing the "Y" co-ordinate position for a cable slung payload, as a function of time, during various experimental translational landing descents.
FIG. 12C is a plot showing the "Z" co-ordinate position for a cable slung payload, as a function of time, during various experimental translational landing descents.

FIGS. 12A-12C show plots of the position trajectory of the payload as a function of time during the experimental translational landing maneuver. In particular, FIG. 12A shows a plot 1200a of the "X" co-ordinate position of the payload as a function of time, FIG. 12B shows a plot 1200b of the "Y" co-ordinate position of the payload as a function of time and FIG. 12C shows a plot 1200c of the "Z" co-ordinate position of the payload as a function of time. FIGS. 12A-12C compare the landing performance for an unguided position controller, and a PPN guided position controller having a gain of k=0.3.

As shown, the PPN guided controller achieves equal or better final accuracy in the "X" and "Y" axes as compared to the unguided controller. In addition, the PPN law slows the payload down in the "Z" axis and achieves a soft touchdown. In contrast, the unguided controller drops the payload on the ground and does not achieve a soft touchdown. During the unguided controller test, touchdown occurs before the payload has reached the final goal location.

Figure 12E:
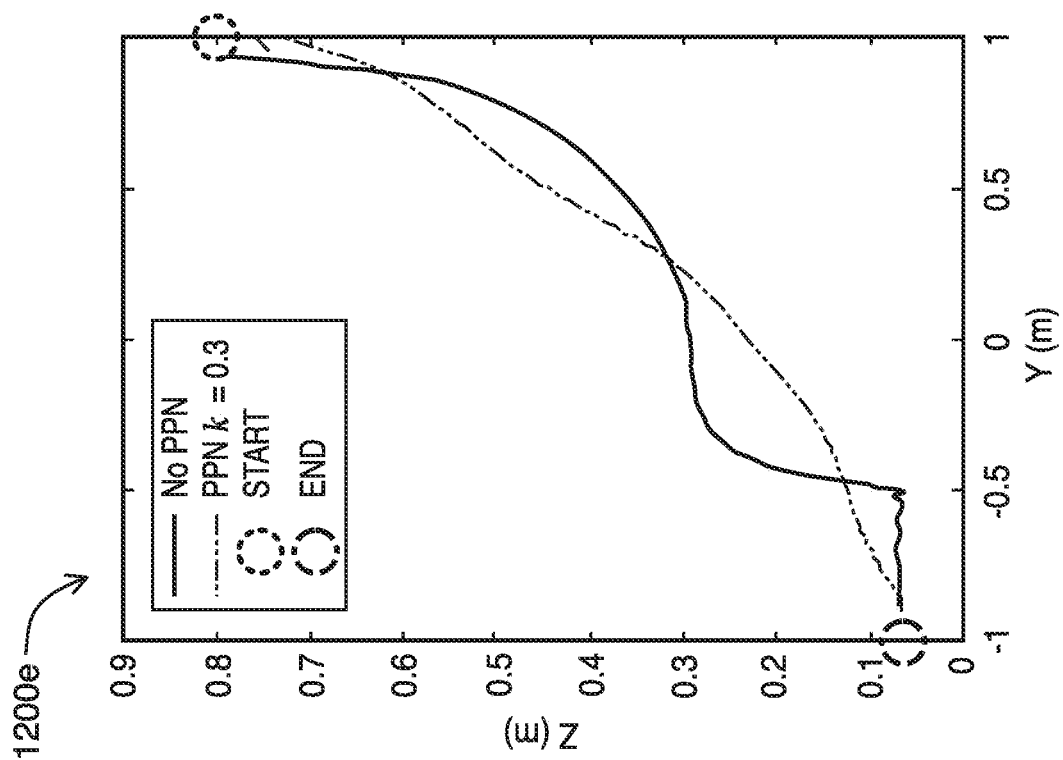
FIG. 12E is a plot showing an "Y-Z" trajectory position for a cable slung payload, as a function of time, during various experimental translational landing descents.
Figure 12D:
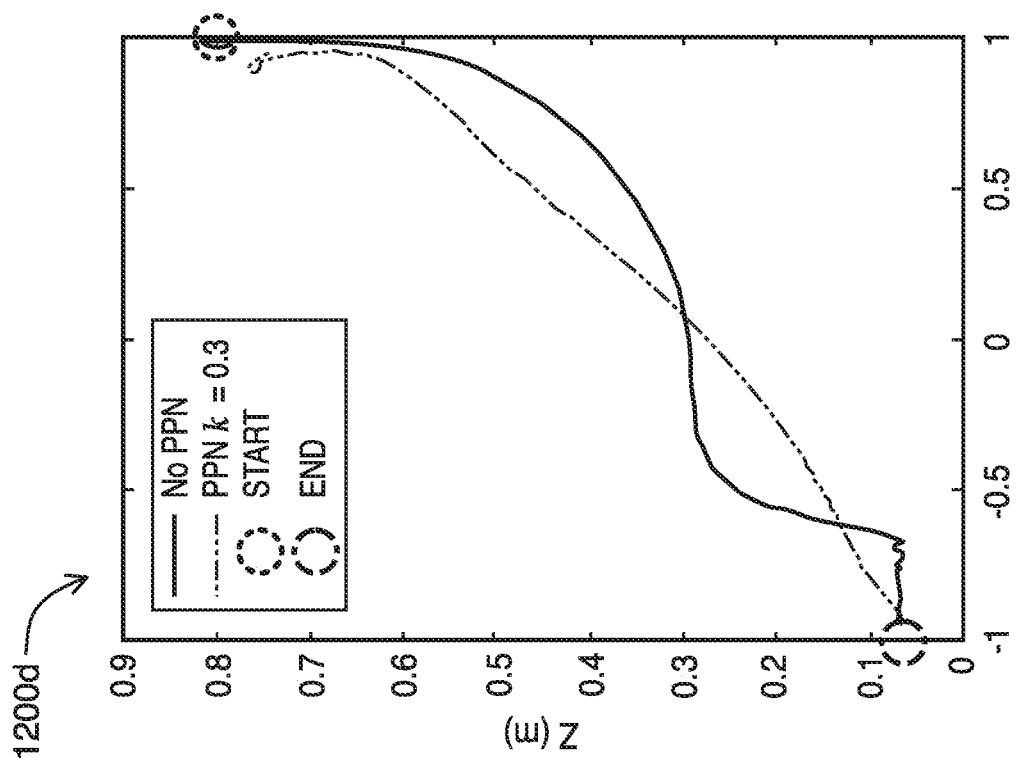
FIG. 12D is a plot showing an "X-Z" trajectory position for a cable slung payload, as a function of time, during various experimental translational landing descents.

FIG. 12D shows a plots 1200d of the X-Z trajectory position of the payload during the experimental translational descent, and FIG. 12E shows a plot 1200e of the Z-Y trajectory position of the payload in the translational descent.

As shown in each of FIGS. 12D and 12E, the PPN guided landing follows a more direct path to the goal, arriving at the target along a nearly straight line. However, as observed in the unguided controller, the payload not only has a steep descent directly into the ground (resulting in a hard landing), but the payload also touches down before the target location has been reached in the "X" and "Y" directions. Accordingly, this results in the quadrotor dragging the payload along the ground until it reaches the desired "X" and "Y" target location. Accordingly, it will be appreciated that the unguided controller generates an un-desirable autonomous landings, which lack smooth and precise touchdowns and, in turn, can damage the payload.

Figure 12F:
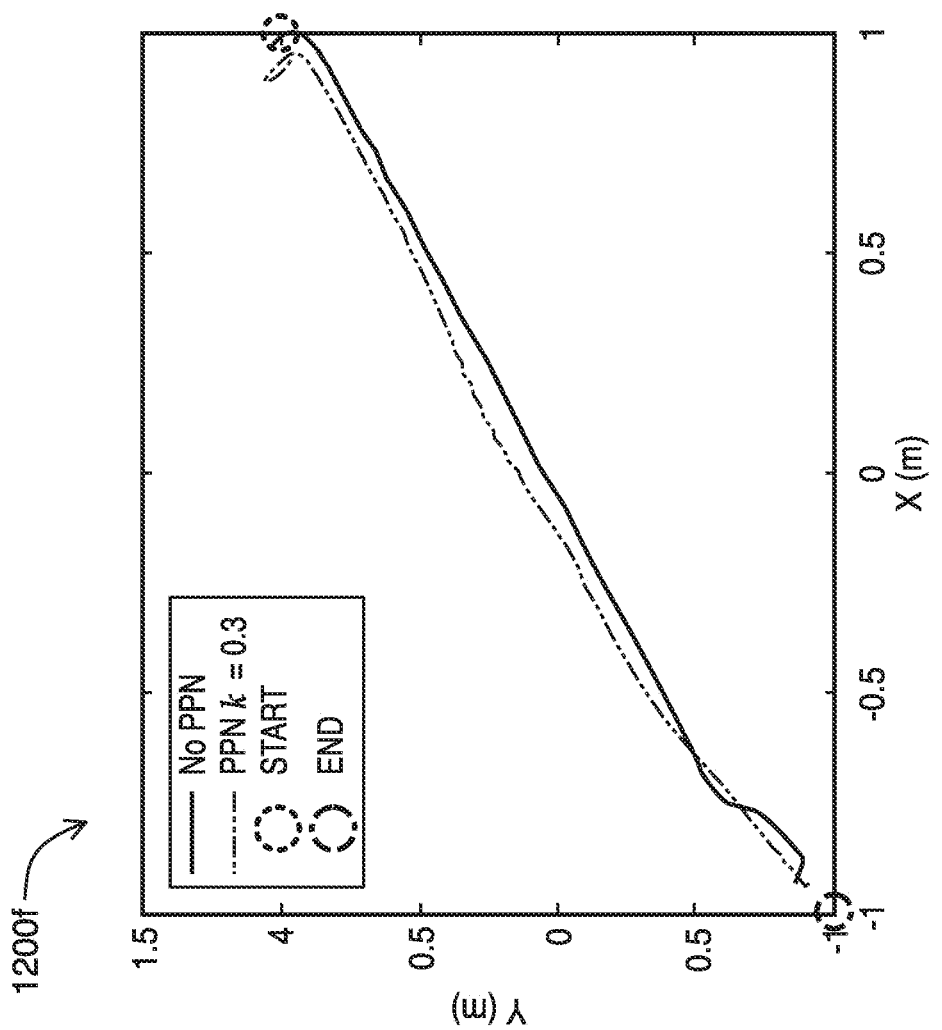
FIG. 12F is a plot showing an "X-Y" trajectory position for a cable slung payload, as a function of time, during various experimental translational landing descents.

FIG. 12F shows a plot 1200F of the X-Y position of the quadrotor UAV during the experimental translational landing maneuver. As shown, both the unguided and PPN guided landings follow a reasonably straight line path to the target location along the "X" and "Y" axes.

Figure 12H:
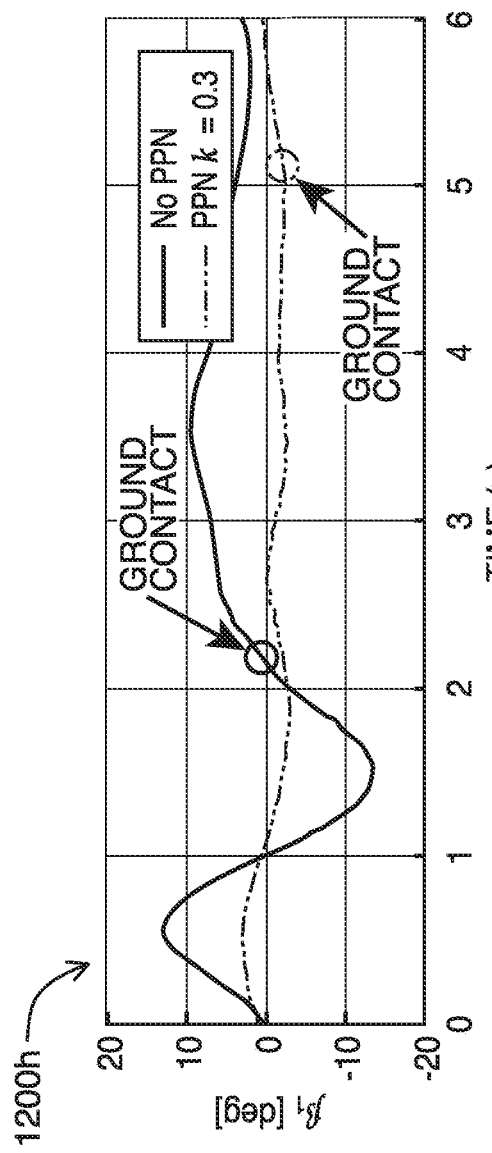
FIG. 12H is a plot showing a first swing angle for a cable slung payload, as a function of time, for various experimental translational landing descents.
Figure 12I:
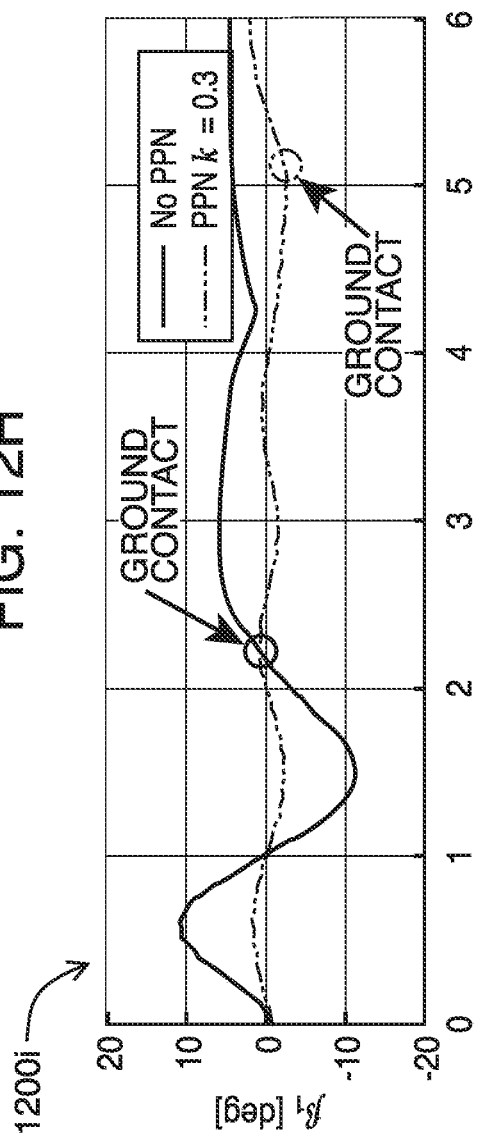
FIG. 12I is a plot showing a second swing angle for a cable slung payload, as a function of time, for various experimental translational landing descents.

FIGS. 12H and 12I show plots of the swing angles for the payload during the experimental translational landing maneuver. In particular, FIG. 12H shows a plot 1200$h$ of a first swing angle direction ($\beta_1$) (e.g., along the X c-ordinate axis) of the payload as a function of time, and FIG. 12I shows a plot 1200$i$ of a second swing angle direction ($\beta_2$) (i.e., along the Y co-ordinate axis) of the payload as a function of time.

As shown in these figures, the unguided landing generates a large swing angle relative to the modified PPN guided landing. In particular, this results from the large initial acceleration of the quadrotor during the unguided landing, which induces the initial swing angle. The swing angle in the unguided case reaches close to 14 degrees, whereas the PPN guided landing maintains the swing angle below 4 degrees. By keeping the swing angle low, the dynamics of the UAV are less disturbed by the payload motion. This, in turn, helps in maintaining an accurate landing. Plots 1200$h$ and 1200$i$ also note the points at which the payload came into contact with the ground, as these are the point where the free-swinging motion of the payload is stopped.

Accordingly, and in view of FIGS. 7-12, it can be appreciated that using the modified PPN guidance law developed in Equations (5)-(22) in conjunction with a stabilized position controller, results in the quadrotor UAV achieving smoother landing trajectories and softer touchdowns. By generating smoother trajectories for the quadrotor UAV, the swing on the payload is reduced during the autonomous landing. Further, using a gain of k=0.3 for the modified PPN law achieves improved results for a combination of smooth and timely landings.

The present invention has been described here by way of example only, while numerous specific details are set forth herein in order to provide a thorough understanding of the exemplary embodiments described herein. However, it will be understood by those of ordinary skill in the art these embodiments may, in some cases, be practiced without these specific details. In other instances, well-known methods, procedures and components have not been described in detail so as not to obscure the description of the embodiments. Various modifications and variations may be made to these exemplary embodiments without departing from the spirit and scope of the invention, which is limited only by the appended claims.

The invention claimed is:

1. A system for landing a payload, the payload being tethered to an unmanned aerial vehicle (UAV) via a tether, the UAV having a plurality of propellers, the system comprising:

at least one memory and at least one processor, wherein the at least one memory is operatively coupled to the at least one processor;

the at least one memory storing a modified pure proportional navigation (PPN) guidance law algorithm and a position controller;

the at least one processor being configured to control landing of the payload tethered to the unmanned aerial vehicle by:
  determining a target landing position for the payload;
  determining a virtual target position for the UAV based on the target landing position for the payload, a length of the tether of the payload, and a swing angle error;
  iteratively determining rotational speed values for the plurality of propellers of the UAV for a plurality of predetermined increments of time until a distance between a current position for the unmanned aerial vehicle and the virtual target position is zero, wherein iteratively determining the rotational speed values comprises:
    for each predetermined increment of time:
      determining, by the processor, the current position for the unmanned aerial vehicle;
      executing the modified PPN guidance law algorithm, wherein the modified PPN guidance law algorithm comprises:
        determining the distance of the current position from the virtual target position, the virtual target position accounting for the swing angle error, the swing angle error accounting for a positional offset caused by a swing angle of the tether; and
        generating a velocity command based on a proportional relationship with the distance, the proportional relationship defined by a predetermined gain factor, the predetermined gain factor determined to minimize overshooting the target landing position;
      executing the position controller, wherein executing the position controller comprises:
        receiving the velocity command from the modified PPN guidance law algorithm; and
        generating a rotational speed value for each of the plurality of propellers of the UAV based on the velocity command; and
      controlling the unmanned aerial vehicle to maintain a velocity based on the rotational speed values of the plurality of propellers until updated rotational speed values are generated for the plurality of propellers based on an updated current position for next predetermined increment of time,
    whereby as the unmanned aerial vehicle approaches the virtual target position, the velocity of the unmanned aerial vehicle reduces to zero,
    wherein the modified PPN guidance law algorithm is executed while the unmanned aerial vehicle is in motion.

2. The system of claim 1, wherein executing the modified PPN guidance law algorithm comprises:
  for each predetermined increment of time: generating a position command from the velocity command, the position command tending towards the virtual target position as the distance reduces to zero.

3. The system of claim 2, wherein one or more positions and one or more movements of the unmanned aerial vehicle are determined in a three-dimensional coordinate system, and wherein the modified PPN guidance law algorithm determines the velocity command for each dimension of the three-dimensional coordinate system.

4. The system of claim 3, wherein the one or more positions and the one or more movements of the unmanned aerial vehicle are determined in Cartesian co-ordinates as (x, y, z), and the target landing position is also expressed in Cartesian co-ordinates as $(x_t, y_t, z_t)$.

5. The system of claim 4, wherein the modified PPN guidance law algorithm determines velocity commands for each of the Cartesian co-ordinates.

6. The system of claim 5, wherein the velocity commands are determined as incremental velocity commands in the X-axis, Y-axis and Z-axis in accordance with equations $\dot{x}_{cmd}=k_x(x_t-x)$; $\dot{y}_{cmd}=k_y(y_t-y)$; and $\dot{z}_{cmd}=k_z(z_t-z)$, respectively, wherein $k_x$, $k_y$ and $k_z$ are gain factors in each of the X-axis, Y-axis and Z-axis directions, respectively.

7. The system of claim 5, wherein the modified PPN guidance law algorithm is configured to generate a position command for each of the Cartesian co-ordinates by determining an integral of the respective velocity command.

8. The system of claim 7, wherein the position commands comprise incremental discrete-time domain position commands in the X-axis, Y-axis and Z-axis directions in accordance with equations $x_{cmd,t}=x_{cmd,t-1}+\dot{x}_{cmd}\Delta t$; $y_{cmd,t}=y_{cmd,t-1}+\dot{y}_{cmd}\Delta t$ and $z_{cmd,t}=z_{cmd,t-1}+\dot{z}_{cmd}\Delta t$, respectively, wherein $x_{cmd,t-1}$, $y_{cmd,t-1}$, and $z_{cmd,t-1}$ are the position commands generated in a previous iteration of executing the modified PPN guidance law algorithm, and $\Delta t$ is the predetermined increment of time value for generating new incremental velocity and position commands.

9. The system of claim 4, wherein the UAV is further equipped with at least one sensor in communication with the at least one processor, and the at least one processor being configured to determine the co-ordinate position (x, y, z) for the unmanned aerial vehicle based on data generated by the at least one sensor.

10. The system of claim 9, wherein the at least one sensor comprises a Global Positioning System (GPS) module which generates GPS co-ordinates.

11. The system of claim 4, wherein the UAV is further equipped with a communication interface in communication with the at least one processor, and the at least one processor is configured to determine a co-ordinate position $(x_t, y_t, z_t)$ for the target landing position based on target information received, via the communication interface, from a flight management system.

12. The system of claim 11, wherein co-ordinates for the virtual target position are determined by the processor based on the target landing position in accordance with equations $x'_t=x_t$, $y'_t=y_t$ and $z'_t=z_t+L$, wherein L defines the length of the tether.

13. The system of claim 12, wherein the at least one velocity command comprises velocity commands in the X-axis, Y-axis and Z-axis directions in accordance with equations $\dot{x}_{cmd}=k_x(x'_t-x)$; $\dot{y}_{cmd}=k_y(y'_t-y)$; and $\dot{z}_{cmd}=k_z(z'_t-z)$.

14. The system of claim 5, wherein the position controller includes an X-Y position controller and an altitude controller, the modified PPN guidance law algorithm supplying the X-Y position controller with at least one of velocity commands and position commands for the X and Y directions, and supplying the altitude controller with at least one of a velocity command and a position command for the Z direction.

15. The system of claim 14, including an attitude controller having an input connected to the X-Y position controller, for receiving Euler angles $(\theta_d, \emptyset_d, \Psi_d)$ corresponding to pitch, roll and yaw directions and generating corresponding actuation torques $[\tau_\varphi, \tau_\emptyset, \tau_\Psi]$.

16. The system of claim 15, wherein the system includes a control mixer connected to the attitude controller for receiving a thrust signal, T, and to the altitude controller, for receiving the corresponding actuation torques $[\tau_\varphi, \tau_\emptyset, \tau_\Psi]$, the control mixer generating the rotational speed values ($\sigma$) for each of the propellers of the unmanned aerial vehicle.

17. The system of claim 16, wherein the unmanned aerial vehicle has four propellers, and the control mixer determines rotational speed values ($\sigma$) for each of the four propellers of the quadrotor UAV ($[\sigma_1, \sigma_2, \sigma_3, \sigma_4]$).

18. The system of claim 14, wherein the modified PPN guidance law algorithm determines position commands for the X, Y and Z directions and supplies these position commands to the X-Y position controller and to the altitude controller.

19. A method for landing a payload, the payload being tethered to an unmanned aerial vehicle (UAV) via a tether, the UAV having a plurality of propellers using a modified PPN guidance law algorithm and a position controller, comprising:

while the unmanned aerial vehicle is in motion:
determining a target landing position for the payload;
determining a virtual target position for the unmanned aerial vehicle based on the target landing position for the payload, a length of the tether of the payload, and a swing angle error;
iteratively determining rotational speed values for the plurality of propellers of the UAV for a plurality of predetermined increments of time until a distance between a current position for the UAV and the virtual target position is zero, wherein iteratively determining the rotational speed values comprises:
for each predetermined increment of time:
determining, by a processor, the current position for the UAV;
executing the modified PPN guidance law algorithm, wherein the modified PPN guidance law algorithm comprises:
determining the distance between the current position for the unmanned aerial vehicle and the virtual target position, the virtual target position accounting for the swing angle error, the swing angle error accounting for a positional offset caused by a swing angle of the tether; and
generating a velocity command based on a proportional relationship with the distance, the proportional relationship defined by a predetermined gain factor, the predetermined gain factor determined to minimize overshooting the target landing position;
executing the position controller, wherein executing the position controller comprises:
receiving the velocity command from the modified PPN guidance law algorithm; and
generating a rotational speed value for each of the plurality of propellers of the UAV based on the velocity command; and
controlling the unmanned aerial vehicle to maintain a velocity based on the rotational speed values of the plurality of propellers until updated rotational speed values are generated for the plurality of propellers based on an updated current position for next predetermined increment of time, whereby as the unmanned aerial vehicle approaches the virtual target position, the velocity of the unmanned aerial vehicle reduces to zero.

20. The method of claim 19, wherein executing the modified PPN guidance law algorithm comprises:
for each predetermined increment of time: generating a position command from the velocity command, the position command tending towards the virtual target position as the distance reduces to zero.

21. The method of claim 20, further comprising determining one or more positions and one or more movements of the unmanned aerial vehicle in a three-dimensional coordinate system, and determining the velocity command for each dimension of the three-dimensional coordinate system.

22. The method of claim 21, wherein the one or more positions and the one or more movements of the unmanned aerial vehicle are determined in Cartesian co-ordinates as (x, y, z), and the target landing position is determined in Cartesian co-ordinates as ($x_t$, $y_t$, $z_t$).

23. The method of claim 22, further comprising determining velocity commands for each of the Cartesian co-ordinates.

24. The method of claim 23, further comprising determining the velocity as incremental velocity commands in the X-axis, Y-axis and Z-axis in accordance with equations $\dot{x}_{cmd}=k_x(x_t-x)$; $\dot{y}_{cmd}=k_y(y_t-y)$; and $\dot{z}_{cmd}=k_z(z_t-z)$, respectively, wherein $k_x$, $k_y$ and $k_z$ are gain factors in each of the X-axis, Y-axis and Z-axis directions, respectively.

25. The method of claim 23, further comprising generating a position command for each of Cartesian co-ordinates by determining a time integral of the respective velocity command.

26. The method of claim 25, further comprising determining the position commands as incremental discrete-time domain position commands in the X-axis, Y-axis and Z-axis directions in accordance with equations $x_{cmd,t}=x_{cmd,t-1}+\dot{x}_{cmd}\Delta t$; $y_{cmd,t}=y_{cmd,t-1}+\dot{y}_{cmd}\Delta t$ and $z_{cmd,t}=z_{cmd,t-1}+\dot{z}_{cmd}\Delta t$, respectively, wherein $x_{cmnd,t-1}$, $y_{cmd,t-1}$, and $z_{cmd,t-1}$ are the position commands generated in a previous iteration of executing the modified PPN guidance law, and $\Delta t$ is the predetermined increment of time value for generating new incremental velocity and position commands.

27. The method of claim 22, further comprising determining the co-ordinate position (x, y, z) for the unmanned aerial vehicle based on data generated by at least one sensor mounted to the UAV.

28. The method of claim 27, wherein the at least one sensor comprises a Global Positioning System (GPS) module which generates GPS co-ordinates.

29. The method of claim 22, further comprising determining the co-ordinate position ($x_t$, $y_t$, $z_t$) for the target landing position based on target information received, via a communication interface mounted to the UAV, from a flight management system.

30. The method of claim 29, further comprising determining co-ordinates for the virtual target position based on the target landing position in accordance with equations $x'_t=x_t$, $y'_t=y_t$ and $z'_t=z_t+L$, wherein L defines the length of a payload tether.

31. The method of claim 30, wherein the at least one velocity command comprises velocity commands in the X-axis, Y-axis and Z-axis directions in accordance with the equations $\dot{x}_{cmd}=k_x(x'_t-x)$; $\dot{y}_{cmd}=k_y(y'_t-y)$; and $\dot{z}_{cmd}=k_z(z'_t-z)$.

32. The method of claim 23, further comprising supplying a X-Y position controller with at least one of velocity commands and position commands for the X and Y directions, and supplying at least one of a velocity command and a position command for the Z direction to an altitude controller.

33. The method of claim 32, further comprising supplying Euler angles ($\theta_d$, $\varnothing_d$, $\Psi_d$) corresponding to pitch, roll and yaw directions to an attitude controller and generating corresponding actuation torques [$\tau_\varphi$, $\tau_\varnothing$, $\tau_\Psi$] using the attitude controller.

34. The method of claim 33, wherein the method includes receiving a thrust signal, T, from the altitude controller and actuation torques [$\tau_\varphi$, $\tau_\varnothing$, $\tau_\Psi$] from the attitude controller, and generating the rotational speed values ($\sigma$) for each of the propellers of the unmanned aerial vehicle.

35. The method of claim 34, wherein the unmanned aerial vehicle has four propellers, and the method determines rotational speed values ($\sigma$) for each of the four propellers of the quadrotor UAV ([$\sigma_1$, $\sigma_2$, $\sigma_3$, $\sigma_4$]).

36. The method of claim 32, further comprising determining position commands for the X, Y and Z directions and supplying these position commands to the X-Y position controller and to the altitude controller.

37. The system of claim 12, wherein the positional offset caused by the swing angle of the tether in the Z-axis is determined in accordance with the equation $\Delta z = L - L \cos \theta$, wherein L defines the length of the tether and $\theta$ defines the swing angle.

38. The system of claim 12, wherein the positional offset caused by the swing angle of the tether in the X-Y plane is determined in accordance with the equation $\Delta xy = L \sin \theta$, wherein L defines the length of the tether and $\theta$ defines the swing angle.

39. The method of claim 30, wherein the positional offset caused by the swing angle of the tether in the Z-axis is determined in accordance with the equation $\Delta z = L - L \cos \theta$, wherein L defines the length of the tether and $\theta$ defines the swing angle.

40. The method of claim 30, wherein the positional offset caused by the swing angle of the tether in the X-Y plane is determined in accordance with the equation $\Delta xy = L \sin \theta$, wherein L defines the length of the tether and $\theta$ defines the swing angle.

* * * * *